(12) United States Patent
Livingston et al.

(10) Patent No.: US 12,417,453 B2
(45) Date of Patent: Sep. 16, 2025

(54) METHODS AND SYSTEMS OF USING SUB-DOMAINS TO FEDERATE DEVICE CREDENTIALS SCOPED TO A COMMON DOMAIN

(71) Applicant: MASTERCARD INTERNATIONAL INCORPORATED, Purchase, NY (US)

(72) Inventors: Edward Neil Livingston, Fife (GB); Rory Macdonald, Cumbernauld (GB); Robert Ouellette, Westwood, NJ (US); Grace Lim, Morganville, NJ (US); Fred M. Pacher, Williston Park, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 110 days.

(21) Appl. No.: 18/523,393

(22) Filed: Nov. 29, 2023

(65) Prior Publication Data
US 2024/0095729 A1 Mar. 21, 2024

Related U.S. Application Data

(62) Division of application No. 17/140,818, filed on Jan. 4, 2021, now Pat. No. 11,900,370.

(51) Int. Cl.
*G06Q 20/38* (2012.01)
*G06Q 20/40* (2012.01)

(52) U.S. Cl.
CPC ....... *G06Q 20/388* (2013.01); *G06Q 20/3829* (2013.01); *G06Q 20/401* (2013.01); *G06Q 2220/00* (2013.01)

(58) Field of Classification Search
CPC . G06Q 20/388; G06Q 20/3829; G06Q 20/401
(Continued)

(56) References Cited

U.S. PATENT DOCUMENTS

2014/0136309 A1 5/2014 Goldman et al.
2019/0139044 A1 5/2019 Piel

OTHER PUBLICATIONS

International Search Report and Written Opinion issued in corresponding International Application No. PCT/US2021/064267, dated Apr. 19, 2022.

*Primary Examiner* — Courtney P Jones
(74) *Attorney, Agent, or Firm* — Pillsbury Winthrop Shaw Pittman LLP

(57) ABSTRACT

A computer-implemented method for authenticating a user device via a device credential scoped to a common domain shared among a plurality of payment networks may be provided. The method may include receiving, by a server of a payment network, a first request redirected from a sub-domain assigned to the payment network to a domain name associated with the payment network, responsive to the first request, transmitting, to the user device, an authentication request comprising a challenge, a user identifier that identifies the user, and the common domain to which the device credential is scoped, receiving, from the user device, a response, accessing the device credential, the device credential having been stored by the payment network, validating the response based on the device credential, and causing, by the server, the user identifier and the device credential to be federated to the other ones of the plurality of payment networks based on the validating.

20 Claims, 13 Drawing Sheets

(58) Field of Classification Search
USPC .......................................................... 705/75
See application file for complete search history.

METHODS AND SYSTEMS OF USING SUB-DOMAINS TO FEDERATE DEVICE CREDENTIALS SCOPED TO A COMMON DOMAIN

CROSS REFERENCE TO RELATED APPLICATION

This application is a divisional of U.S. Non-Provisional patent application Ser. No. 17/140,818; filed on Jan. 4, 2021, and entitled "METHODS AND SYSTEMS OF USING SUB-DOMAINS TO FEDERATE DEVICE CREDENTIALS SCOPED TO A COMMON DOMAIN", the entire contents of which is incorporated herein by reference in its entirety.

BACKGROUND

A remote commerce transaction is a payment transaction in which a user does not interact with a physical payment terminal, such as when making an online purchase. Processing the remote commerce transaction may involve obtaining payment information and authenticating a user. Processing techniques may vary from one merchant to another merchant and even from one payment network to another payment network, delivering an inconsistent experience for the user that may be vulnerable to phishing and other types of attacks.

One way to secure the remote commerce transaction is to perform multi-factor authentication, which may include authenticating user on their device to conduct the remote commerce transaction. Authenticating the user device may involve registering the user device to create a device credential and then later authenticating the device credential. However, in order to prevent phishing and other attacks, the registering party and the authenticating party may be required to be on the same domain or sub-domain. Put another way, the device credential may be scoped to the domain or sub-domain. The result is that a user may be required to register the user device for each merchant or payment network which are more disruptive to the end user.

BRIEF DESCRIPTION OF THE DRAWINGS

Features of the present disclosure may be illustrated by way of example and not limited in the following figure(s), in which like numerals indicate like elements, in which.

DETAILED DESCRIPTION

Figure 1:
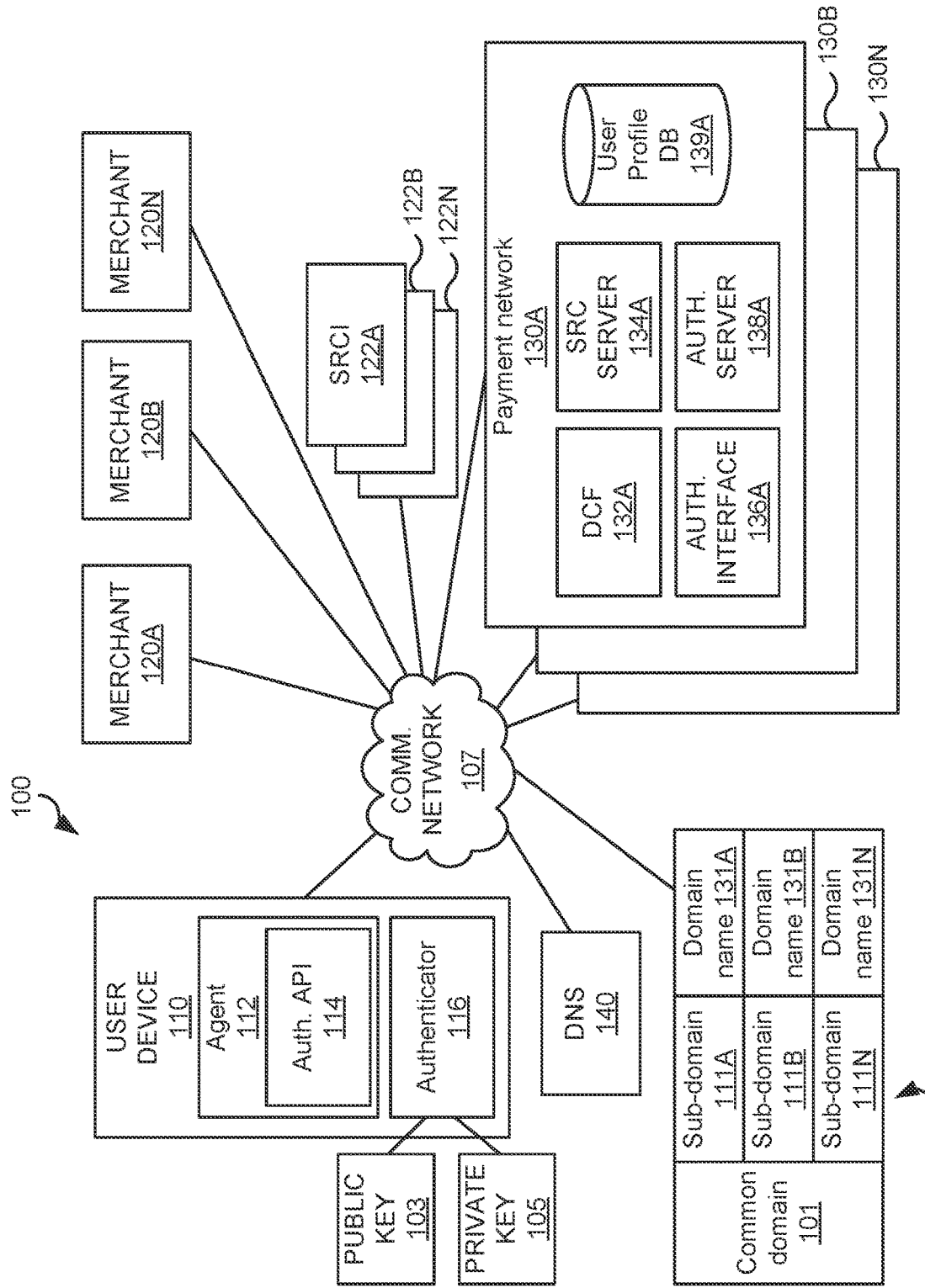
FIG. 1 illustrates an example of a system of creating and federating a device credential scoped to a common domain and authenticating a user device across parties that use the federated device credential.

The disclosure herein relates to methods and systems of federating scoped device credentials among relying parties by assigning each relying party to a sub-domain of a common domain. A relying party may refer to a registering party that registers a device to create a device credential or an authenticating party that authenticates the user device based on the device credential. A relying party may include a payment network, a merchant, and/or other participating parties that may register or authenticate a user device. Such registration or authentication may be in connection with a remote commerce transaction involving the user device.

The methods and systems disclosed herein may leverage the security offered by a scoped device credential and facilitate federation across relying parties despite the scope limitation, improving the efficiency of the registration and authentication process. For example, a scoped device credential may be resistant to phishing attacks since a user is unable to inadvertently release the device credential and a malicious actor would be unable to otherwise access the device credential because of the scope limitation. Federation of the scoped device credential may improve the efficiency of the registration and authentication because a user device may be registered to create and federate a device credential at any participating registering party. Likewise, once registered, the user device may be authenticated by any participating authenticating party. Thus, federation of the scoped device credential may eliminate having to register the user device for each merchant, payment network or other relying party, such as when processing remote commerce transactions.

To federate a scoped device credential, an entity may establish a common domain. A sub-domain of the common domain may be assigned to each participating relying party. The assignment may be made by the entity or a trusted participating relying party. A participating relying party may map its assigned sub-domain name to a domain name (such as a universal resource locator that resolves to an IP address) associated with the participating relying party. The participating relying party may then expose an authentication interface at the domain name. Requests made to the sub-domain may be redirected, such as via a Domain Name System (DNS) lookup, to the domain name. Thus, requests made to the sub-domain may be redirected to the authentication interface exposed by the relying party.

The authentication interface may then perform registration and/or authentication operations by specifying the common name as a relying party identifier. Because a sub-domain is within the scope of a parent domain name (in this case, the common domain), the device credential scoped to the common domain may be enforced when communicating with any authentication interface that is reachable at its assigned sub-domain.

When a relying party registers a user device, the relying party may federate the resulting device credential, which may be scoped to the common domain, to other relying parties. Thus, the user device need not be registered at other participating relying parties. In some examples, each relying party may trust the registering party's registration. In other examples, each relying party may independently authenticate the federated device credential without having to re-register the user device. To illustrate scope enforcement, registration, and authentication, an example of a network authentication combination, the WebAuthn standard and the FIDO2 specification, will be described. Other authentication standards and techniques that use scoped device credentials may be used as well or instead of the WebAuthn standard and the FIDO2 specification.

A user device implementing the WebAuthn standard may include an agent such as a web browser that includes a WebAuthn Application Programming Interface (API) that communicates with an authenticator. The authenticator may include a platform authenticator that authenticates a user through biometric and/or other authentication technique enabled on the device. The platform authenticator may be used for other user authentication functions such as to unlock the user device. The authenticator may generate a FIDO2 credential to register user device. The FIDO2 credential may be scoped to a domain name of a participating registering party.

When an unregistered user device communicates with a merchant who is a participating relying party or uses another participating relying party that acts on behalf of the merchant, the merchant may trigger device authentication by making an API create call to the WebAuthn API. The API create call may specify the common domain as the relying party identification (RPID) for scoping purposes. Responsive to the API create call, the WebAuthn API may cause the authenticator to authenticate the user and generate a FIDO2 credential. When returning the FIDO2 credential to the relying party, the authenticator and/or the agent may enforce the scope by inspecting an origin of the outbound transmission back to the calling party (the merchant) to ensure that the origin is within the scope of the common name. In this case, the sub-domain assigned to the merchant will be within the scope of the common name.

The FIDO2 credential may be federated by the merchant to the other relying parties, such as via a JavaScript Object Notation (JSON) web token. After the FIDO2 credential is federated, when the user device visits another relying party or the same relying party, that relying party may, through its authentication interface, trigger an authentication of the device credential. For example, the other relying party may transmit an API get call to the WebAuthn API for authentication. The relying party may then authenticate a response to the API get call to verify the identity of the user device. Having described a brief description of examples of the methods and systems described herein, attention will now turn to an example of a system that facilitates federation of a scoped device credential.

FIG. 1 illustrates an example of a system 100 of creating and federating a device credential scoped to a common domain and authenticating a user device across relying parties that use the federated device credential. The system 100 may implement a network authentication specification, which may specify use of a scoped credential that limits who or what may access and use the scoped credential. The network authentication specification may include the WebAuthn/FIDO2 specification (in which case the device credential may include a FIDO2 credential), although other network authentication specifications that employ scoped credentials may be used as well. The system may also employ interoperability between various relying parties to facilitate "click-to-pay" functionality in which a user's payment information such as credit card numbers and other forms of payment identifiers may be registered and stored in a user profile, thereby establishing a virtual wallet. These and other benefits may be generally referred to as "secure remote commerce" (SRC) processing. SRC processing may be combined with the network authentication specification and federation of scoped credentials to provide improved secure and seamless remote commerce transactions such as click-to-pay functionality with federated device credentials across various relying parties. It should be noted, however, that the term "SRC" in various system components described herein does not intend to be limited to any specific authentication implementation. Rather, the term SRC may denote that the component participates in remote commerce transaction integration with other relying parties.

Furthermore, in the examples disclosed herein throughout, the payment networks 130 are illustrated as both relying and authenticating parties for illustrative convenience. It should be noted, however, that other parties such as the merchant 120 may be a relying and/or authenticating party. In these examples (not illustrated), the merchant 120 and/or others may implement some or all of the illustrated features of the payment network 130.

The system 100 may include a user device 110, a plurality of merchants 120 (individually illustrated as merchants 120A, B, N), one or more Secure Remote Commerce (SRC) Initiators (SRCI) 122 (individually illustrated as SRCI 122A,B,N), a plurality of payment networks 130 (individually illustrated as payment networks 130A, B, N), a Domain Name System (DNS) 140, a mapping table 142, and/or other components. The components of the system 100 may be connected to one another via a communication network 107, which may include the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network through which system 100 components may communicate.

The user device 110 may include a device such as a smartphone, a tablet device, a wearable device, a personal computer, and/or other device having computational and storage capabilities to generate, store, and use device credentials that are federated across the payment networks 130. The user device 110 may facilitate purchase transactions with one or more merchants 120 via one or more of the payment networks 130. For example, a user may use the user device 110 to purchase goods and/or services at a digital shopping application such as a remote commerce webpage of the merchant 120 over the communication network 107.

The user device 110 may include an agent 112, an authentication Application Programming Interface (API) 114 (illustrated as Auth. API 114), and an authenticator 116. The agent 112 may include an application such as a web browser of the user device 110. The agent 112 may include the authentication API 114. The authentication API 114 may expose API calls that may control operations of the authenticator 116. For example, a remote application may transmit, via the communication network 107, client-side scripts such as JavaScript executing on the agent 112 that makes the API calls. The API calls may include, among others, an API create call and an API get call.

Responsive to the API create call, the authenticator 116 may generate a key pair that includes a public key 103 (which may serve the basis for the device credential) and a private key 105 (which may be used to authenticate the user device 110 by showing possession of the private key 105). The public key 103 may be shared with the calling party (such as the remote interface) or others. The private key 105 may not be shared. Instead, the private key 105 may be stored at the user device 110 such as by the authenticator 116. Data digitally signed (cryptographically encrypted) using the private key 105 of the key pair may be decrypted by the public key 103 of the key pair to obtain the unsigned, original, data. Thus, decryption of digitally signed data using the public key 103 may provide proof that the signing authority (the authenticator 116) has possession of the private key 105 and therefore is a trusted source of the key pair. In some examples, the authenticator 116 may generate a FIDO2 credential used as the device credential. Other types of device credentials may be used as well, so long as they may be scoped as described herein.

In addition to generating device credentials, the authenticator 116 may include hardware and/or software to authenticate an identity of a user of the user device 110. In some examples, the authenticator 116 may include a platform authenticator integrated with the user device 110. In these examples, the authenticator 116 may authenticate a user to perform authentication functions such as unlocking the user device 110 that depend on user identity authentication. Also, in these examples, the authenticator 116 may authenticate the user based on biometric authentication such as a fingerprint, face identification, or other biometric information, a Personal Identification Number (PIN), and/or other authentication techniques that are integrated with the user device 110. In some examples, the authenticator 116 may include a roaming authenticator that is a standalone device, such as a key fob style token device that communicates with the agent 112.

In some examples, the agent 112 and/or the authenticator 116 may enforce the scope of the device credential. For example, the agent 112 and/or the authenticator 116 may ensure that inbound communications originate from a domain name that matches the scope of the device credential. Alternatively, or additionally, the agent 112 and/or the authenticator 116 may ensure that outbound communicates are destined to a domain name that matches the scope of the device credential.

The agent 112 may be used to browse a purchase interface of a merchant 120. Each merchant 120 may be a registered SRC merchant. A registered SRC merchant may refer to a merchant that is registered to accept SRC payment transactions. An SRC payment transaction may refer to a payment transaction facilitated by the SRC servers 134A-N and processed through the relevant payment networks 130A-N. The purchase interface of the merchant 120 may include an SRC payment option that when selected invokes an SRCI 122 that may initiate SRC payments on behalf of the merchant 120. For example, each merchant 120 may encode in their webpage an option that invokes its corresponding SRCI 122.

An SRCI 122 may refer to an interface (such as instructions that encode a graphical user interface or portion thereof) that initiates SRC payment transactions. The SRCI 122 may be operated by the merchant 120 directly or may be operated by another entity acting on behalf of the merchant 120 such as a payment service provider, a payment gateway, a payment acquirer, and/or other entities. Regardless of which entity operates the SRCI 122, the SRCI 122 may interact with a digital payment application (DPA) operating at the purchase interface of the merchant 120 and SRC server 134A (or equivalents at payment networks 130B,N) to initiate and complete checkout on behalf of the merchant 120. An SRCI 122 may also facilitate discovery and selection of payment options such as payment cards.

Upon selection of the SRCI payment option (such as selection of a "c-2-pay" option), the SRCI 122 may determine whether the consumer and their device (or browser) is recognized. If so, and a device credential exists for the device 110, the device credential may be authenticated as described herein. Upon authentication of the device credential, the payment cards stored with the consumer's user profile (stored at user profile database 139) are displayed. If the device is unrecognized, the SRCI checkout process will ask the cardholder for their email address, then communicate with an payment network 130 (via the common JavaScript library) participating in SRC to establish which, if any, the cardholder has registered to use. If the cardholder has used an SRC checkout on the device before (and accepted a "Remember me" option) then a browser cookie may be used to identify the returning user.

The SRCI 122 may then transfer the flow to the appropriate Digital Card Facilitator (DCF). API calls will also be made between the SRCI 122 and the appropriate SRC entity, such as a payment network 130.

Figure 8:
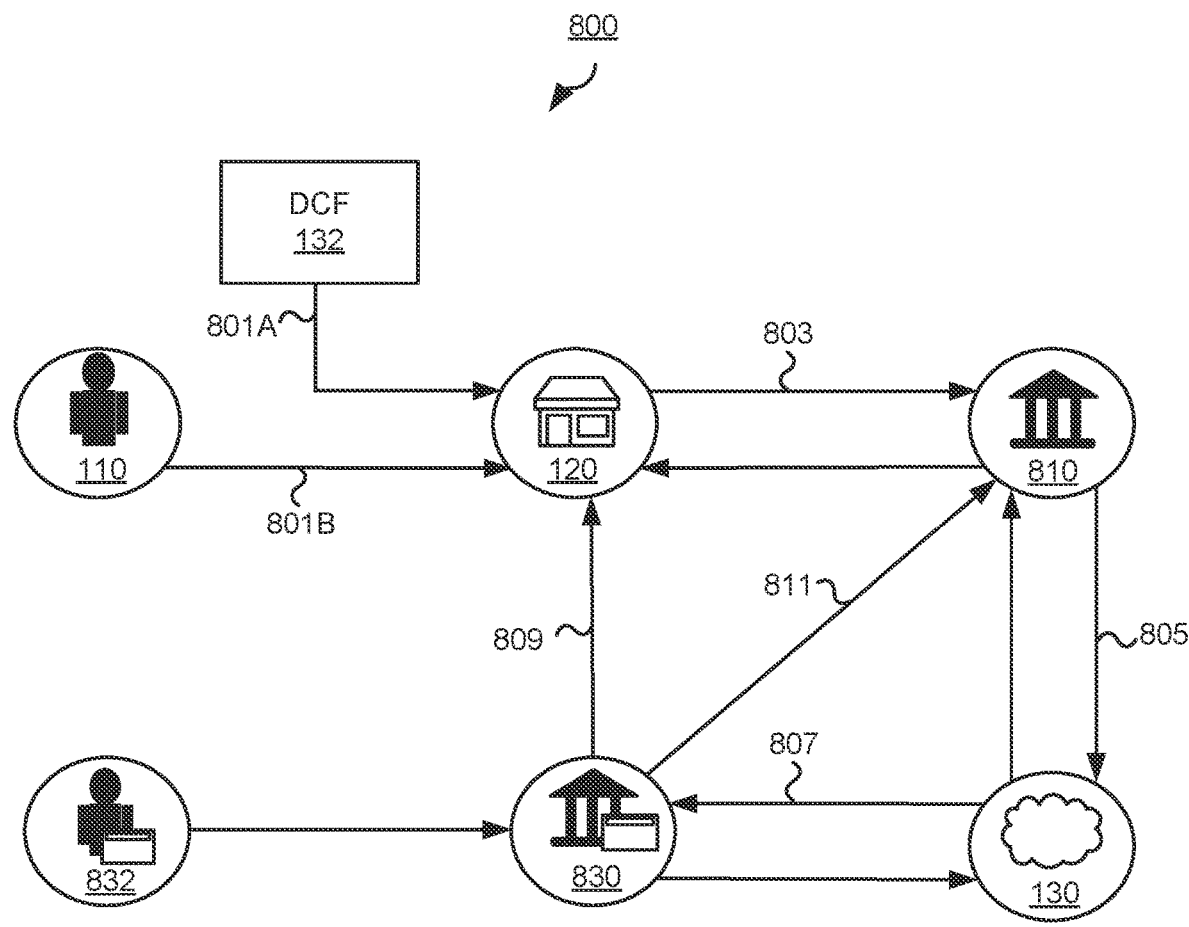
FIG. 8 illustrates a data flow diagram of an example of processing a remote commerce payment transaction.

In some examples, the SRCI 122 may integrate with one or more interfaces of the payment networks 130, which may include payment card networks such as the Mastercard® network and other payment card networks. For illustrative convenience, only payment network 130 (payment network 130A) is illustrated with further detail in FIG. 1. It should be noted that the other payment networks 130B,N may be similarly configured and may each operate similarly to authenticate, federate and use a device credential. An example of processing payments via a payment network 130 is illustrated at FIG. 8.

To facilitate the creation and use of a federated device credential, the payment network 130A may include one or more servers, a user profile database (DB) 139, and/or other components. The one or more servers may include a digital card facilitator (DCF) 132A, an SRC server 134A, an authentication server 138A (illustrated as auth. server 138A), and/or other servers.

The DCF 132A may provide an interface for adding, removing, or updating a user profile of a user, which may be stored at the user profile database 139A along with other user profiles of other users. A user profile of a user may refer to information that may be prestored to facilitate payment transactions of a user through the payment networks 130. For example, a user profile of a user may include user identifying information, a payment credential that includes payment information (such as credit card numbers, expiration dates, and CCV codes), shipping addresses, device credential identifiers associated with the user, and/or other information to facilitate user payment transactions through the payment networks 130. It should be noted that, through the DCF 132A, a user may add multiple forms of payment, such as multiple credit cards, to a user profile of the user.

The SRC server 134A may provide interfaces to link together various components of the system 100 to register and authenticate a scoped device credential for the user device 110 to facilitate payment transactions over the payment networks 130. For example, the SRC server 134A may expose an authentication interface 136A that is reachable through the domain name 131A. The authentication interface 136A may communicate with the agent 112 through API calls to the authenticator API 114 to control operations of the authenticator 116. The authentication interface 136A may communicate responses to the API calls to the authentication server 138A, which may authenticate the responses to authenticate the device credential from the authenticator 116. Upon authentication, the authentication server 138A may notify the SRC server 134A of such authentication.

In response, the SRC server 134A may generate a token and federate the token using any of various federation techniques. In some examples, the SRC server 134A may transmit the token to the SRCI 122, which may federate the token after device credential authentication. In some examples, the token may be updated to include authentication information such as the user identification of an authenticated user, the challenge and the credential details. The token may be digitally signed by the SRC server 134A using a private key (similar to the private key 105) of the SRC server 134A. Other SRC servers of other payment networks 130B,N may authenticate the token via a public key (similar to the public key 103) of the SRC server 134A. In a particular example, the SRC server 134A may update a JSON web token (JWT) with the challenge and credential details. The JWT may then be provided to other relying parties, such other payment networks 130A-N, through various JSON interfaces. Other types of tokens that may convey the token information between the payment networks 130 may be used as well. In another example, to federate the device credential, the SRC server 134A may store the challenge and credential details to a federated DBMS accessible to the payment networks 130. Based on the federated token, other payment networks 130B,N may independently authenticate the user device 110 without the user registering the user device 110 for each of the other payment networks 130B,N.

However, a payment network 130 may be unable to independently authenticate the user device 110 based on the now federated device credential that may be scoped to the domain name 131 of another payment network 130 that caused creation of the device credential because of the payment networks 130 may be associated with respective domain names 131. For example, payment network 130A may include the Mastercard® network. In this example, the payment network 130A may be associated with the domain name 131A, which may include "mastercard(.)com" with parentheses added. Similarly, payment network 130B corresponding to another payment card network may be associated with the domain name 131B, which may include "paymentcard(.)com" with parentheses added, and so on. Because of these different domain names, federation of a scoped credential across the payment networks 130 may not be possible.

To federate a scoped credential across the payment networks 130, an entity may establish a common domain 101, which the payment networks 130 may use to scope the creation of the device credential. The entity may include one or more operators of the payment networks 130 or others. The entity may assign each payment network 130A-N with a respective sub-domain 111 (individually illustrated as sub-domains 111A, B, N). For example, the payment network 130A may be assigned with sub-domain 111A, the payment network 130B may be assigned with sub-domain 111B, and the payment network 130N may be assigned with sub-domain 111N. Each of the sub-domains 111A-N may be a sub-domain of a common domain 101. Accordingly, each sub-domain 111 may be within the same scope of the common domain 101. The entity may be responsible for adding other sub-domains for other payment networks 130 that wish to participate in the federated credentialing described herein. A mapping table 142 (or portion of the mapping) between the sub-domains 111 and respective domain names 131 may be maintained, stored, or otherwise accessed by each of the payment networks 130A.

To facilitate redirection of the sub-domains 111 to an appropriate domain name 131A, the entity may set up a canonical name (CNAME) record in a Domain Name System (DNS) 140. For example, a CNAME record may specify the sub-domain 111A as an alias of domain name 131A, which is a canonical name for the sub-domain. In turn, the domain name 131A may be an alias to an Internet Protocol (IP) address that resolves to an authentication interface 136A of the payment network 130A. When a DNS resolver of the DNS 140 receives the sub-domain name 111A and queries a DNS table or cache for the sub-domain name 111A, the DNS resolver may access the Canonical Name (CNAME) record and determine that it is an alias of a canonical name (the domain name 131A). The DNS resolver may then search for the domain name 131A and determine that it is an alias of an IP address, which resolves to the authentication interface 136A. Thus, the DNS 140 may redirect requests from the sub-domain 111A to the domain name 131A (ultimately to the IP address aliased by the domain name 131A). The entity may maintain the common domain 101 to ensure that unwanted parties (such as malicious actors) are unable to add sub-domains to the common domain 101.

Figure 2:
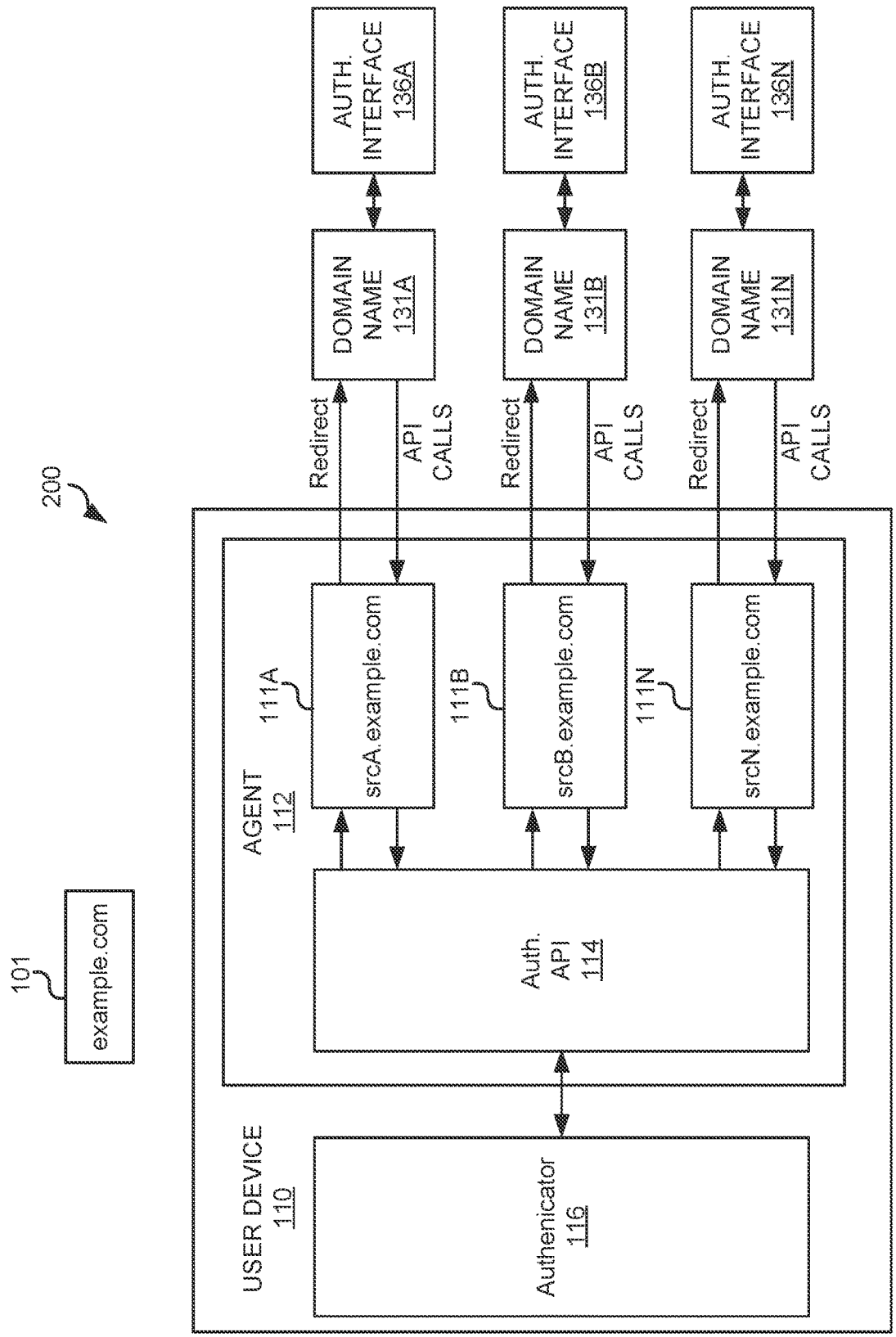
FIG. 2 illustrates a data flow diagram of redirecting from sub-domains respectively assigned to payment networks to domain names of the payment networks to facilitate the federation of a scoped credential across the payment networks.

FIG. 2 illustrates a data flow diagram 200 of redirecting from sub-domains 111A-N respectively assigned to payment networks 130 to domain names of the payment networks to facilitate the federation of a scoped credential across the payment networks 130. In the illustrated examples of FIG. 2, the agent 112 may be instructed to browse to a sub-domain 111A, which may include the sub-domain "srcA(.).example(.)com" with the parentheses omitted. The sub-domain 111A may be assigned to the payment network 130A. The agent 112 may browse to the sub-domain 111A by, for example, transmitting a Hyper Text Transfer Protocol (HTTP) request directed to the sub-domain 111A. The sub-domain 111A may be redirected to the domain name 131A, such as by the DNS 140 illustrated in FIG. 1. The domain name 131A may resolve to an authentication interface 136A provided by the payment network 130A.

The authentication interface 136A may transmit API calls to the authentication API 114 operating at the agent 112. In other examples, the agent 112 may be instructed to browse to a sub-domain 111B, which may include the sub-domain "srcB(.).example(.)com" with the parentheses omitted. The agent 112 may browse to the sub-domain 111B, which may be redirected to the domain name 131B, such as by the DNS 140 illustrated in FIG. 1. The domain name 131B may resolve to an authentication interface 136B (similar to the authentication interface 136A illustrated in FIG. 1) of the payment network 130B. Likewise, the agent 112 may be instructed to browse to a sub-domain 111N, which may include the sub-domain "srcN(.).example(.)com" with the parentheses omitted. The agent 112 may browse to the sub-domain 111N, which may be redirected to the domain name 131N, such as by the DNS 140 illustrated in FIG. 1. The domain name 131N may resolve to an authentication interface 136N (similar to the authentication interface 136A illustrated in FIG. 1) of the payment network 130N.

The API calls from any of the authentication interfaces 136A-N may include the common domain 101 as the value of the RPID and may be made through respective subdomains 111A-N. Thus, API create calls may result in the generation of a public key 103 that is scoped to a credential on the common domain 101. Likewise, API get calls may be used to authenticate device credentials scoped to the common domain.

Figure 3A:
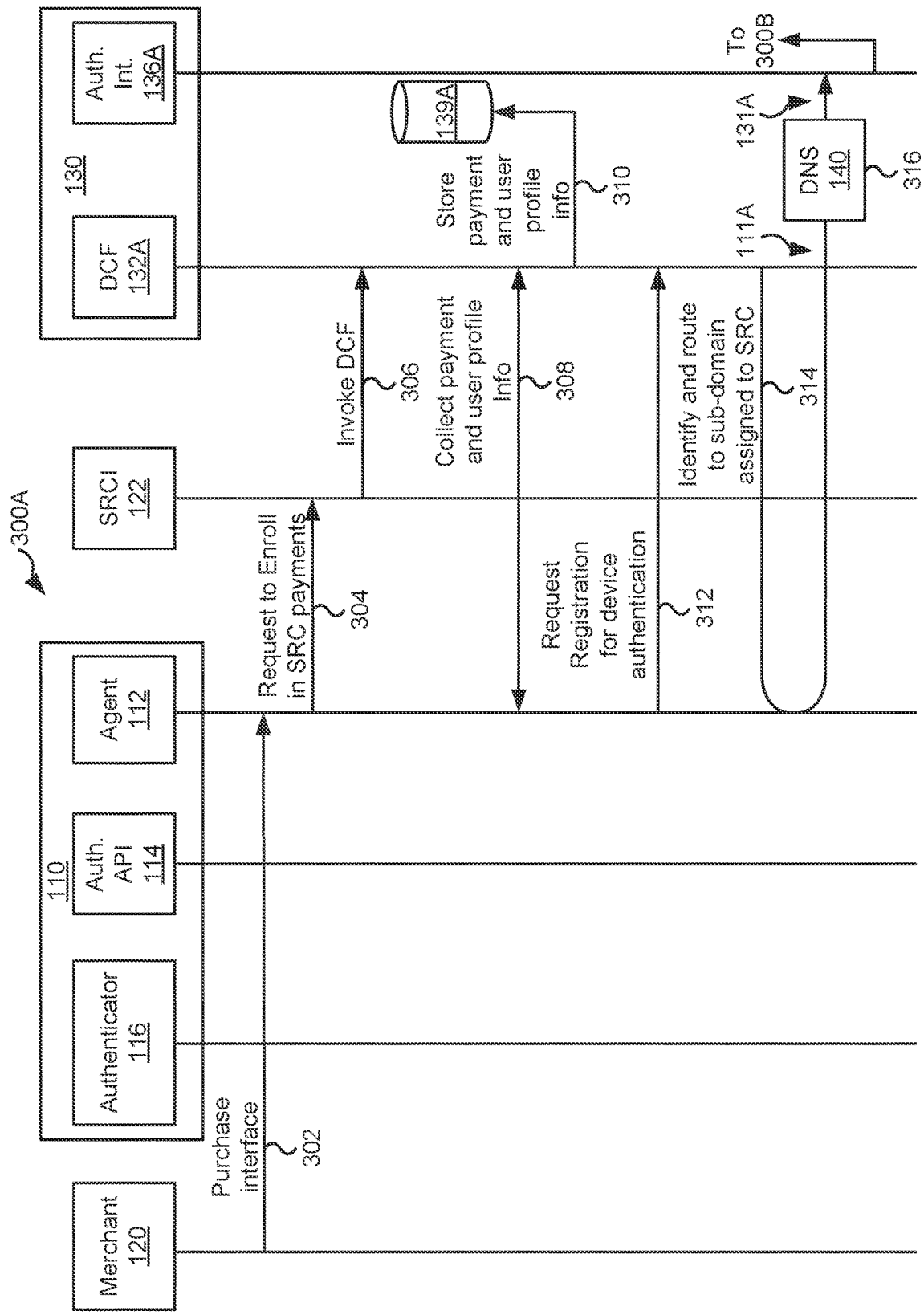
FIGS. 3A and 3B illustrate data flow diagrams that together are an example of registering a user device to generate a device credential to be federated.
Figure 3B:
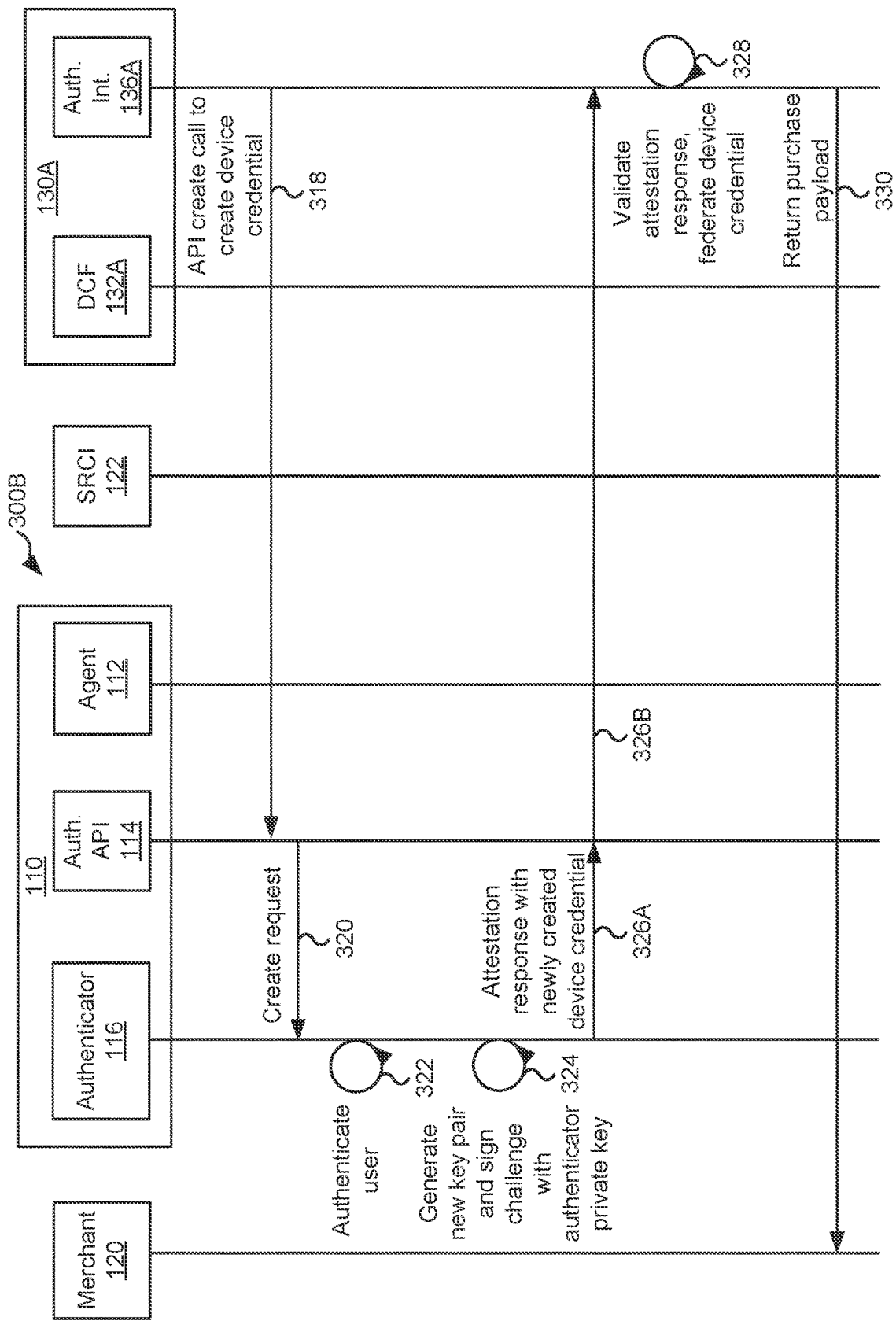

FIGS. 3A and 3B illustrate data flow diagrams 300A and 300B that together are an example of registering a user device 110 to generate a device credential to be federated. As used in the examples that follow, the term "transfer" may refer to one component providing an instruction to a receiving component to communicate with an intended destination. For example, a server may cause a browser to "transfer" to a destination URL by providing instructions, or scripts, for the browser to do so. An example of such instruction to transfer may include an HTTP redirect instruction, which is not to be confused with the redirect, which may be facilitated by the DNS 140, from a sub-domain 111 to a domain name 131. The term "invoke" may refer to a component initiating functionality of another component. For example, a web browser may make a request to a destination URL to access functionality of an application of the destination URL.

Referring first to FIG. 3A, at 302, a purchase interface associated with the merchant 120 may be transmitted to the agent 112 of the user device 110. For example, a website checkout of the merchant 120 may be transmitted to a web browser of the user device 110 to complete an online purchase transaction. The purchase interface may include an option to enroll in SRC payments so that the user may use "c-2-pay" functionality with SRC payments.

At 304, upon selection by the user of the option to enroll in SRC payments, the agent 112 may be transferred to an SRCI 122 that initiates SRC payments on behalf of the merchant 120. For example, the agent 112 may browse to an address such as a URL of the SRCI 122. The transfer may include a checkout payload, which may include purchase details such as item identifiers that identify items to be purchased in an electronic cart, which may be retained through various transfers described in the data flow diagrams 300A,B so that the checkout payload may be returned back to the purchase interface once the user has enrolled in SRC payments and/or the user device 110 has been registered to generate a device credential.

At 306, the SRCI 122 may transfer the agent 112 to the DCF 132A of an appropriate payment network 130 with which the SRCI 122 may be integrated.

At 308, the DCF 132A may collect payment and user profile information. For example, the DCF 132A may provide one or more interfaces to the agent 112 that provide user inputs that receive payment information, such as credit card number, expiration date, and Card Verification Value (CVV) code. The one or more interfaces may also provide user inputs that receive user profile information such as user identifying information, billing information, shipping information, and/or other information.

At 310, the DCF 132A may store the payment and user profile information in the user profile database 139A (illustrated in FIG. 3A as "139A" for convenience). The user profile database 139A may be consulted after the user is enrolled to automatically recall the payment information, user profiling information, and/or other information collected by the DCF 132A at block 308. In some examples, the DCF 132A may perform authentication via one-time-password or other authentication.

In some examples, after or in conjunction with collection and storage of the payment and user profile information, and in some instances after authentication, the DCF 132A may provide an input option to register the user device 110 to enable device authentication.

At 312, the agent 112 may transmit a request to the DCF 132A to register the user device 110 for device authentication upon user selection of the input option, indicating verification to register.

At 314, the DCF 132A may identify the sub-domain 111A assigned to the payment network 130A. For example, the DCF 132A may store all or a portion of the mapping table 142 illustrated in FIG. 1 and/or may otherwise access the mapping table 142. In particular, the DCF 132A may determine that the sub-domain 111A has been assigned to the network 130A and the DCF 132A may route the agent 112 to the identified sub-domain 111A. For example, the DCF 132A may provide instructions to the agent 112 to browse to the sub-domain 111A.

At 316, the sub-domain 111A may be redirected to domain name 131A. The domain name 131A may resolve to the authentication interface 136A. The authentication interface 136A may make API calls to the authentication API 114 to create a device credential to be federated to other payment networks 130B,N.

Referring now to the data flow 300B illustrated at FIG. 3B, at 318, the authentication interface 136A may transmit, to the authentication API 114, an API create call to generate a device credential. The API create call may include, among other things, a challenge, an RPID, user identifying information such as a user identifier used in the user profile database 139A, and/or other information for configuring parameters of credential creation. The challenge may include a randomly generated string. The authentication server 138A may set the value of the RPID to be the common domain 101.

An example of the API create call appears in pseudocode below. It should be noted that the API create call (and other examples API calls illustrated herein) may include different or other values and code. The pseudocode is therefore provided for illustrated purposes to show the types of data that may be conveyed by the API call:

```
navigator.credentials.create ({
    publicKey: {
        challenge: "4f79bba7-ff66-4910-b2de-250991d89db6",
        timeout: 20000,
        authenticatorSelection: {
        userVerification: "required",
        authenticatorAttachment: "platform"
        }
        attestation: "direct",
        user: {
        id: "07b4cfcf-a841-441e-b9be-b36c55df881c",
        name: "name@emaildotcom",
        displayName: "name@emaildotcom"
        },
        pubKeyCredParams: [
        {
        alg: -7,
        type: "public-key"
        }
        ],
        rp: {
        name: "SRC"
        id: "example(.)com"
        }
    }
})
```

At 320, the authentication API 114 may transmit a credential create request to the authenticator 116.

At 322, the authenticator 116 may authenticate the user. For example, the authenticator 116 may require the user to input authentication information such as by inputting biometric information (such as a fingerprint, facial feature, retinal feature, and/or other biometric information), secret information such as a PIN, and/or other authentication information. If the user fails to authenticate, the authenticator 116 may return an error response (not illustrated).

At 324, the authenticator 116 may generate a new key pair, such as the public key 103 and the private key 105. Generation of the new key pair may indicate that the user has been authenticated by the authenticator 116 (at 322). Thus, the key pair may be associated with the user identifier that identifies the user. The authenticator 116 may also generate a credential identifier that identifies the public key 103. The public key 103 may serve as the basis for the device credential to be federated. The private key 105 may be stored by the authenticator 116, and not shared outside the authenticator 116. To establish trust that the authenticator 116 created the new key pair, the authenticator 116 may digitally, such as cryptographically, sign the challenge from the API create call with a private key (similar in terms of key cryptography to the private key 105) of the authenticator 116. A relying party may then determine whether the authenticator 116 signed the challenge based on a corresponding public key of the authenticator 116.

In some examples, the authenticator 116 may enforce the scope of the public key 103 (and therefore the scope of the device credential) by comparing the RPID included in the API create call and the create request with a domain name from which the API create call was made. Because the domain name is made by the authentication server 138A (which was redirected from the sub-domain 111A of the common domain 101), the authenticator 116 may validate that the origin of the API create call matches the RPID. In this way, the authenticator 116 may ensure that an entity that made the API create call has not provided (maliciously or mistakenly) an RPID that does not match an origin domain name. In these examples, responsive to such validation, the authenticator 116 may store the public key 103 in association with the newly created credential for the RPID to ensure that the public key 203 is scoped to the RPID, the value of which may be the common domain 101. It should be noted that communications to or from the authenticator 116, the authentication API 114 (and therefore the agent 112 where the authentication API 114 is part of the agent 112) may be similarly validated for scope. Thus, the authenticator 116 and the agent 112 may individually or together enforce the scope of device credentials.

At 326A and 326B, the authenticator 116, via the authentication API 114, may transmit an attestation response that may include the public key 103, the digitally signed data based on the challenge, the credential identifier, and/or other data back to the authentication interface 136A. For example, the attestation response may include a WebAuthn attestation response that encodes user and/or credential objects according to the FIDO2 or other credential generated by other credential specifications.

At 328, the authentication interface 136A may provide the attestation response to the authentication server 138A, which may decode the attestation response according to the FIDO2 or other credential specification. The authentication server 138A may validate the device credential (such as the public key 103) by decrypting the all or a portion of the decoded attestation response to ensure that the challenge was properly returned. Upon validation of the device credential, the authenticator server 328A may provide a notification of such validation to the SRC server 134A (not shown in FIG. 3A or 3B). Responsive to the notification, the SRC server 134A may generate and share token information with payment networks 130B,N. The token information may include the device credential, the credential identifier, the user identifier, any attestation data from the authenticator 116, and/or other information relating to the public key 103. In some examples, the SRC server 134A may generate a JSON web token (JWT) based on the token information and share the JWT with other payment networks 130B,N, such as through the SRCI 122.

At 330, the authentication interface 136A may return the checkout payload back to the merchant 120 so that the merchant 120 may complete the purchase transaction with the user device 110.

Figure 4:
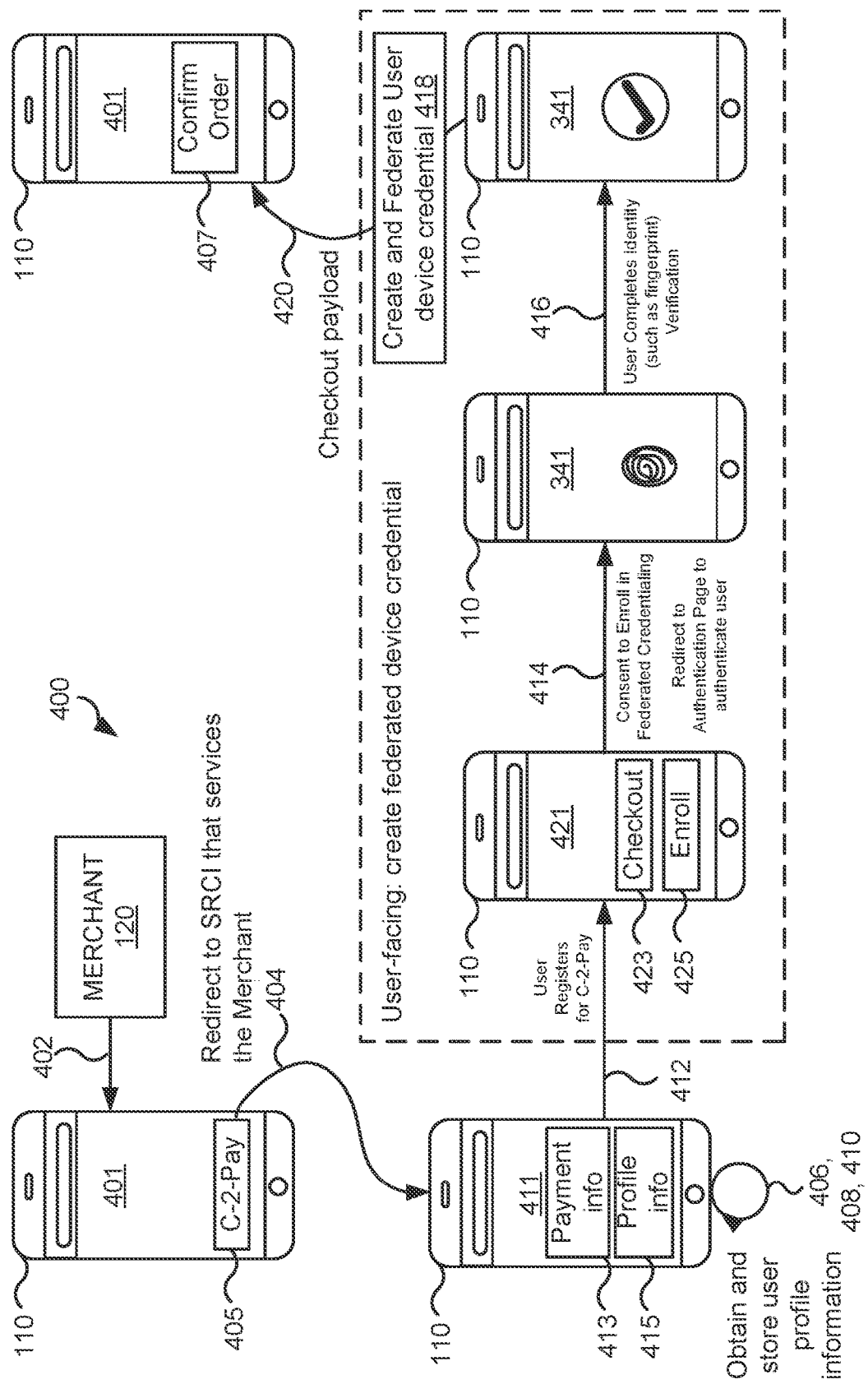
FIG. 4 illustrates a data flow diagram of an example of user-facing creation of a device credential based on sub-domains.

FIG. 4 illustrates a data flow diagram 400 of an example of user-facing creation and federation of a device credential based on sub-domains. The data flow diagram 400 illustrates various interfaces and therefore experience of a user while enrolling in SRC payments and registered the user device 110 for authenticating the user device as shown in data flow diagrams 300A and 300B respectively illustrated at FIGS. 3A and 3B.

At 402, the merchant 120A may provide an application interface 401 to the user device 110 to make the purchase. The application interface 401 may include a website rendered by the agent 112 (such as a web browser) of the user device 110. The application interface 401 may include a selection option 405 associated with SRC payments (such as a "c-2-pay" button).

At 404, upon selection of the selection option 405 (such as a user clicking the c-2-pay button), the application interface 401 may cause the agent 112 to transfer to the appropriate SRCI 122, which facilitates SRC payments on behalf of the merchant 120. As previously noted, the merchant 120 may operate the SRCI 122, such as from a server or other device of the merchant 120, or the SRCI 122 may be operated by another entity such as payment service provider to execute SRC transactions on behalf of the merchant 120.

At 406, the SRCI 122 may determine that the user device 110 has not enrolled to participate in SRC payments. For example, the SRCI 122 may determine whether a cookie or other data is stored at the user device 110 to indicate enrollment to participate in SRC payments. If the user device 110 is not enrolled to participate in SRC payments, the SRCI 122 may provide the user device 110 with an interface (which may be displayed via the agent 112) to obtain payment information 413 from the user. The payment information may include a credit card number, an expiration date, and/or other payment information to be used for SRC payments. It should be noted that if the user device 110 is enrolled to participate in SRC payments, then processing may proceed as described in data flow diagrams 500A and 500B respectively illustrated at FIGS. 5A and 5B.

Still referring to 406, the SRCI 122 may identify an appropriate DCF 132 based on the payment information. For example, the payment information may include a Mastercard® credit card number, in which case the SRCI 122 may identify the DCF 132A that corresponds to the Mastercard® payment network. If the payment information included a credit card number associated with another payment network, then the SRCI 122 may identify another DCF 132 (such as DCF 132B or N) corresponding to the other payment network.

At 408, the SRCI 122 may transfer the user device 110 to the identified DCF 132A.

At 410, the DCF 132A may provide the user device 110 with an interface 411 (which may be displayed via the agent 112) to obtain user profile information 415 relating to the user. The user profile information may include a billing address, a shipping address, a user identification, a user electronic mail address, a phone number, and/or other user information. It should be noted that the payment information 413 and the profile information 415 may be collected from the user using different interfaces. In some examples, the payment and profile information may be stored in the user profile database 139A In some examples, a cookie or other data may be stored at the user device 110 to indicate enrollment in SRC payments responsive to collection of the payment and profile information. In some examples, the DCF 132A may perform one-time password or other authentication via a user electronic mail address, SMS text message, or other secondary user identity authentication.

At 412, upon completion of the user profile information and any authentication of the user profile information, the DCF 132A may provide an interface 421 to the user device 110. The interface 421 may include a continue to checkout option (illustrated as "checkout option 423" for illustrative convenience) or an enroll option 425. Selection of the checkout option 423 may cause the DCF 132A to direct the user device 110 to the application interface 401 without enrolling in federated credential authentication (only enrolling payment and profile information).

At 414, responsive to selection of the enroll option 425, the DCF 132A may transfer the user device 110 to the assigned sub-domain 111A of the payment network 130A. For example, the DCF 132A may provide the agent 112 of the user device 110 with the sub-domain 111A and an instruction to browse to the sub-domain 111A. In response, the agent 112 may transmit a request, such as an HTTP request, directed to the sub-domain 111A. The request may be redirected from the sub-domain 111A to the domain name 141A, as illustrated in FIG. 2, for example. The redirection may be facilitated by the DNS 140 or via DNS table accessible to the user device 110. The domain name 141A may resolve to the authentication interface 136A.

At 416, the authentication interface 136A may make API calls to the authentication API 114 of the agent 112. Through the API calls and responses to the API calls, the authentication application 136A may cause the user device 110 to authenticate the user via fingerprint or other user identity. The authentication application 136A may provide the user device 110 with a confirmation interface 341 to indicate identity authentication.

At 418, the authentication interface 136A may make further API calls to create and provide a device credential, which may then be federated by the SRC server 134A to other ones of the payment networks 130B,N. An example of generation and federation of a device credential is described further with respect to the data flow diagrams 300A and 300B respectively illustrated in FIGS. 3A and 3B. At 420, the SRC server 134A may return a checkout payload to the purchase interface 401 of the merchant to complete the checkout via a confirm order input 407.

Figure 5A:
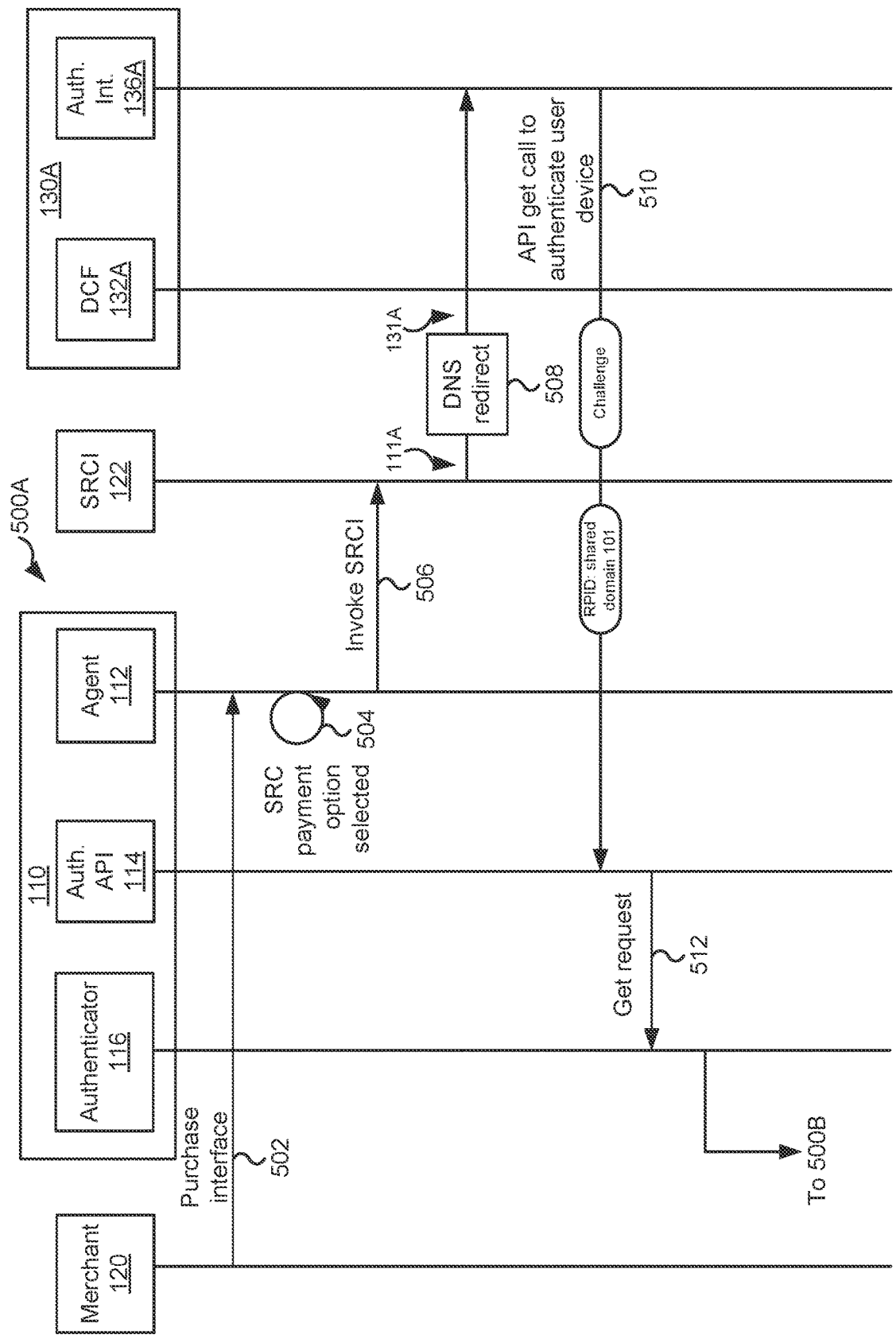
FIGS. 5A and 5B illustrate data flow diagrams that together are an example of authenticating a user device based on a federated device credential.
Figure 5B:
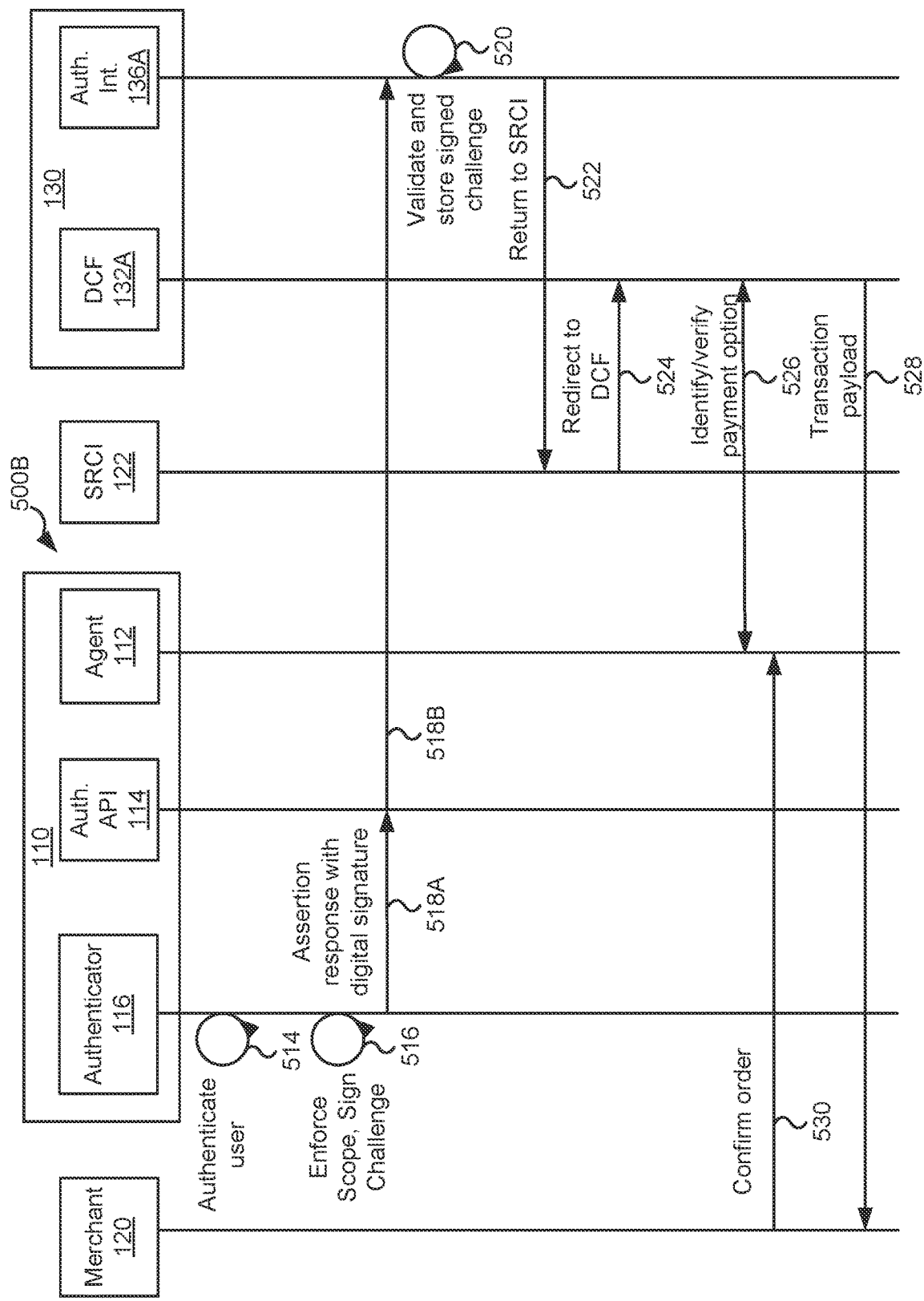

FIGS. 5A and 5B illustrate data flow diagrams 500A and 500B that together are an example of authenticating a user device based on a federated device credential.

With reference first to FIG. 5A, at 502, a purchase interface associated with the merchant 120 may be transmitted to the agent 112 of the user device 110. For example, a website checkout of the merchant 120 may be transmitted to a web browser of the user device 110 to complete an online purchase transaction. The purchase interface may include an option to select an SRC payment option for which the user has enrolled. It should be noted that the user may enroll one or more SRC payment options for one or more payment networks 130A-N. Such enrollment may have been made via the data flow diagrams 300A and 300B respectively illustrated in FIGS. 3A and 3B.

At 504, the agent 112 may receive a selection of an SRC payment option, such as a particular credit card of a user processed on a payment card network like the Mastercard® network processed through the SRC server 134A.

At 506, the agent 112 may invoke the SRCI 122 associated with the merchant 120 and/or the SRC server 134A associated with the SRC payment option selected at 504. The SRCI 122 may route the agent 112 to the sub-domain 111A assigned to the SRC server 134A.

At 508, the sub-domain 111A may be redirected to domain name 131A This redirection may be similar to the way in which redirection occurs at block 316 illustrated at FIG. 3A.

At 510, the authentication interface 136A may transmit an API get call to authenticate the user device 110. The API get call may include, among other things, a challenge, an RPID, and binding information (such as a credential identifier and/or a type of credential to be authenticated) to identify a device credential to be authenticated. The challenge may include a randomly generated string. The authentication server 138A may set the value of the RPID to be the common domain 101.

The API get call may cause the authenticator 116 to provide the public key 103 scoped to the common domain 101.

```
navigator.credentials.get({
    publicKey: {
        challenge: "4f47f90-f0b0-40eb-9716-a123495e38f",
        timeout: 20000,
        userVerification: "required",
        allowCredentials: [
            {
                id: "AdIfzEqbCpLFuu0zLdSyH80fAQx1Kkf31lIYh1lc_8JQBcx4...",
                type: "public-key",
                transport: "internal"
            }
        ],
        rpId: "example(.)com"
    }
}
)
```

At 512, the authentication API 114 may transmit a credential get request to the authenticator 116 based on the API get call.

Referring now to the data flow diagram 500B illustrated at FIG. 5B, at 514, the authenticator 116 may verify the identity of the user. Such user identity verification may be similar to the manner in which the authenticator authenticates a user at block 322 illustrated at FIG. 3B.

At 516, the authenticator 116 may enforce the scope of the RPID included with the API get call. The authenticator may access the private key 105 generated for credential during registration (such as at block 324 illustrated at FIG. 3B). Using the private key 105, the authenticator 116 may digitally sign the challenge and/or other data included in the API get call.

At 518A and 518B, through the authentication API 114, the authenticator 116 may transmit an assertion response back to the authentication interface 136A. The assertion response may include encoded data that includes a digitally signed challenge.

At 520, the authentication interface 136A may provide the assertion response to the authentication server 138A, which may decode and validate the assertion response according to the WebAuthn and FIDO2 specification or other authentication and credential specification that may be used. Validation of the assertion response may indicate that the user identified by the user identifier has been authenticated because the authenticator 116 would not have provided the assertion response if the user was not authenticated. Validation of the assertion response may further indicate that the device credential is valid based on digital signature verification of the assertion response according to the WebAuthn and FIDO2 specification or other authentication and credential specification that may be used. Upon validation of the assertion response, the authentication server 138A may notify the SRC server 134A (not illustrated) that the device credential has been authenticated. The SRC server 134A may then generate or update a token (such as based on token information included in a JWT described at 328B of FIG. 3B) that includes the challenge and credential details such as the device credential, the user identifier, the assertion response, validation of the assertion response, and/or other information.

At 522, the authentication interface 136A may invoke the SRCI 122A for further SRC payment processing responsive to the authentication using the federated device credential (public key 103). In some examples, the authentication interface 136A may transmit the token to the SRCI 122A, which may federate the token. Federation of the token may cause the user identifier and the device credential to be federated to other relying parties, such as other payment networks 130. Using the federated token, each relying parting may then independently validate the user and the device associated with the federated token.

At 524, the SRCI 122A may present a listing of SRC payment options (such as through the agent 112) and identify an SRC payment option that is selected by the user to make the SRC payment. The SRCI 122A may then invoke the DCF 132A. In some examples, the SRCI 122A may transmit the token to the DCF 132A.

At 526, the DCF 132A may prompt the user to verify payment information by presenting an interface via the agent 112.

At 528, the SRCI 122A may provide the selected payment credential to the merchant 120 for completing the purchase transaction via SRC payment. In some examples, the DCF 132A or the SRCI 122A may transmit the token to the merchant 120 for the SRC payment, which may be processed by another SRC server 134.

At 530, the merchant 120 may provide the agent 112 with an interface to confirm completion of the SRC purchase transaction. It should be noted that the merchant 120 may then submit the SRC purchase transaction for payment via payment network 130A. An example of such payment is illustrated at FIG. 8.

Figure 6:
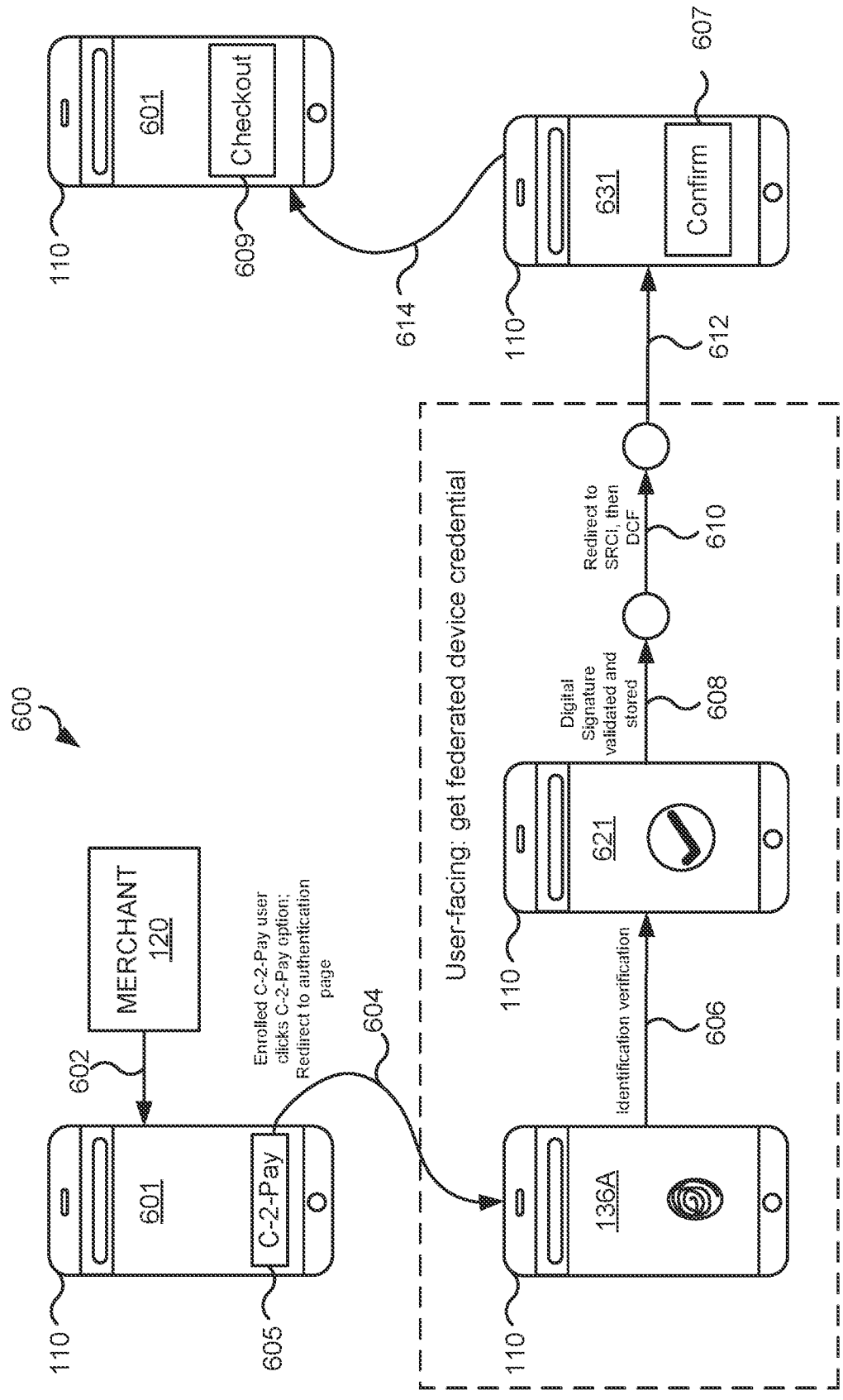
FIG. 6 illustrates a data flow diagram of an example of user-facing authentication of a device credential based on sub-domains of the common domain.

FIG. 6 illustrates a data flow diagram 600 of an example of user-facing authentication of a device credential based on sub-domains of the common domain. The data flow diagram 400 illustrates various interfaces and therefore experience of a user while authenticating the user and the user device 110 as shown in data flow diagrams 500A and 500B respectively illustrated at FIGS. 5A and 5B.

At 602, a purchase interface 601 associated with the merchant 120 may be transmitted to the agent 112 (not illustrated) of the user device 110. For example, a website checkout of the merchant 120 may be transmitted to a web browser of the user device 110 to complete an online purchase transaction. The purchase interface 601 may include a selection option 503 associated with SRC payments (such as a "c-2-pay" button).

At 604, upon selection of the selection option 605 (such as a user clicking the c-2-pay button), the purchase interface 601 may cause the agent 112 to invoke the appropriate SRCI 122, which redirects the agent 112 to an authentication interface of the authentication server 138A. As previously noted, the merchant 120 may operate the SRCI 122, such as from a server or other device of the merchant 120, or the SRCI 122 may be operated by another entity such as payment service provider to execute SRC transactions on behalf of the merchant 120. The SRCI 122 may transfer to an authentication interface 136A.

The authentication interface 136A may transmit an API get call (an example of which is illustrated at block 510 of FIG. SA) to the authentication API 114, which may cause a prompt to the user to perform user authentication such as through biometric authentication, PIN authentication, and/or other user authentication that may be used by the user device 110 to authenticate the user for screen unlocking or other purposes.

At 606, upon authentication of the user, an enrolled user may be provided with an interface 621 that indicates such verification. For example, the authentication interface 136A may provide the interface 621 to indicate that the user has been authenticated.

At 608, the digitally signed device credential received from the API get call may be validated. Because this validation may occur in the background, interface 621 may continue to be displayed at the user device 110.

At 610, the user device 110 may be redirected to the SRCI 122, which may present a list of available SRC payment options (such as payment cards) to process the SRC payment. Upon selection of an available SRC payment option, the SRCI 122 may redirect to the DCF 132A. In the illustrated example, only one SRC payment option (associated with the SRC server 134A) is shown. Thus, the SRCI 122 may select that SRC payment option.

At 612, the DCF 132A may transmit an interface 631 to the user device. The interface 631 may include the selected SRC payment option and include an input option 607 ("confirm" button) to confirm the use of the selected SRC payment option.

At 614, upon confirmation of the selected SRC payment option, the DCF 132A may redirect the agent 112 to the purchase interface 601 along with the checkout payload. the purchase interface 601 may include an input option 609 ("checkout" button) to complete the purchase and initiate an SRC payment transaction.

Figure 7:
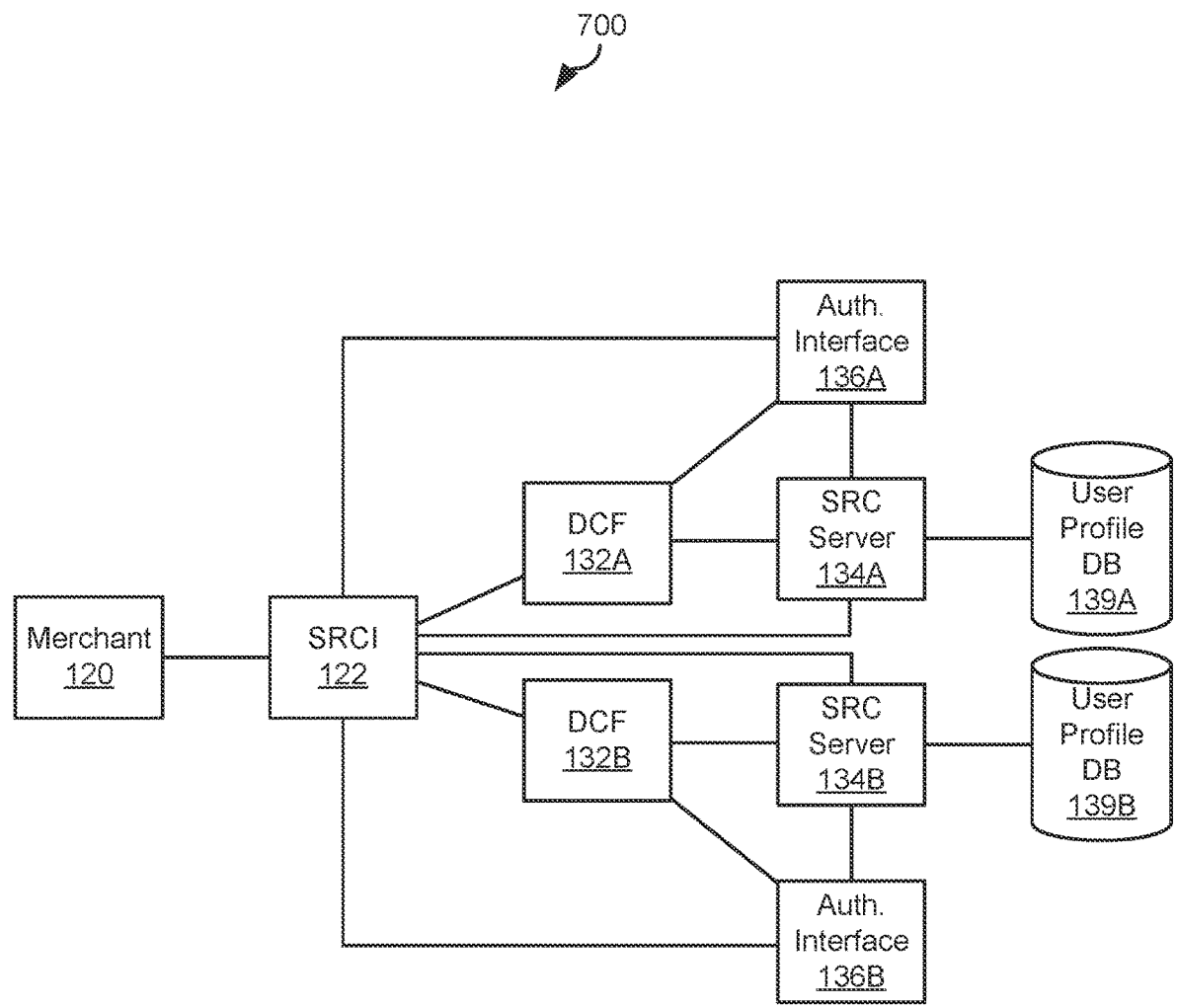
FIG. 7 illustrates an example of an architecture for federating a device credential based on sub-domains of the common domain.

FIG. 7 illustrates an example of an architecture 700 for federating a device credential based on sub-domains of the common domain. In some examples, an SRCI 122A may interface with the authentication interface 136A and the authentication interface 136B. Thus, the SRCI 122A may interface with different payment networks 130 to initiate SRC payments and to initiate device authentication by various payment networks such as payment network 130A and 130B (via their respective authentication interfaces 136A and 136B). The SRCI 122A may also interact with various other parts of the payment networks 130. For example, the SRCI 122A may obtain enrolled payment card information from DCF 132A and from DCF 132B. In this manner, if a user has enrolled payment cards from different payment networks 130, the SRCI 122A may be able to identify all enrolled payment cards (and/or other forms of enrolled payments). Likewise, the SRCI 122A may be able to interface with SRC servers 134A and 134B to access user profile database 139A and 139B. As such, the SRCI 122A may be able to initiate device authentication and also SRC payments. In some examples, such device authentication may occur before an enrolled payment card is selected for processing an SRC payment.

FIG. 8 illustrates a data flow diagram of an example of processing a remote commerce payment transaction. At 801A, the DCF 134 may provide, through a purchase interface of the merchant 120, with payment options. The payment options may include payment card options stored in a user profile database 139. At 801B, the user device 110 may transmit a selection of a payment option for an SRC transaction.

At 803, upon submission of the SRC payment transaction, a digital purchase application of the purchase interface may capture the customer's account information associated with the selected payment option and transmits the account information to the merchant's acquirer 810. At 805, the acquirer 810 transmits, to the payment network 130, a request to obtain authorization from the customer's issuing bank 830.

At 807, payment network 130 may transmit, to the issuing bank 830, an authorization request. At 809, the issuing bank 830 may authorize the transaction and route the authorization response back to the merchant 120. If the transaction is not authorized, a rejection response may be routed back to the merchant 120. At 811, the issuing bank 830 may route the payment to the merchant's acquirer 810, which deposits the payment into the merchant's account.

Figure 9:
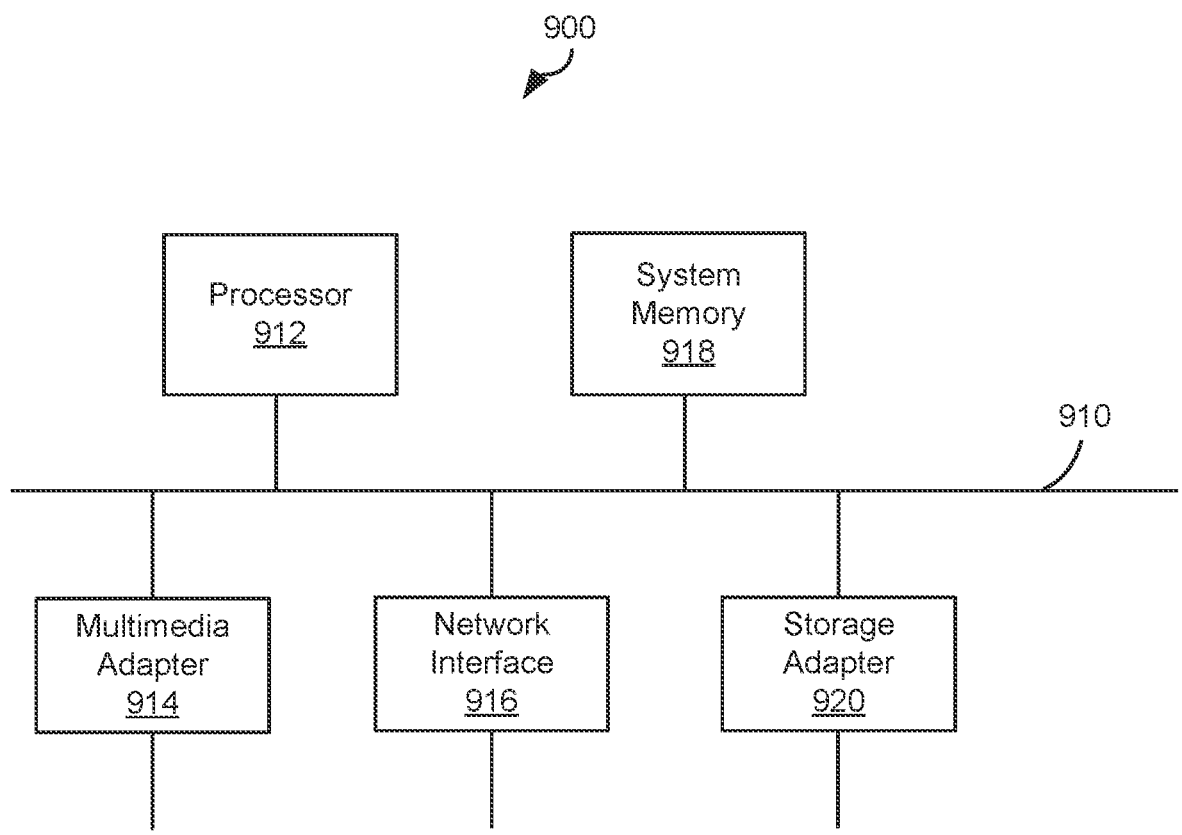
FIG. 9 illustrates an example of a computer system.

FIG. 9 illustrates an example of a computer system 900. The computer system 900 may be part of or include the system 100 to perform the functions and features described herein. For example, various ones of the devices of system 100 may be implemented based on some or all of the computer system 900. For example, the user device 110, each of the merchant devices 120A-N, the DCF 132A, the SRC server 134, and the authentication server 138 may implement some or all of the computer system 900.

The computer system 900 may include, among other things, an interconnect 910, a processor 912, a multimedia adapter 914, a network interface 916, a system memory 918, and a storage adapter 920.

The interconnect 910 may interconnect various subsystems, elements, and/or components of the computer system 900. As shown, the interconnect 910 may be an abstraction that may represent any one or more separate physical buses, point-to-point connections, or both, connected by appropriate bridges, adapters, or controllers. In some examples, the interconnect 910 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect 910 may allow data communication between the processor 912 and system memory 918, which may include read-only memory (ROM) or flash memory (neither shown), and random-access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 912 may control operations of the computing system 900. In some examples, the processor 912 may do so by executing instructions such as software or firmware stored in system memory 918 or other data via the storage adapter 920. In some examples, the processor 912 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 914 may connect to various multimedia elements or peripherals. These may include devices associated with visual (e.g., video card or display), audio (e.g., sound card or speakers), and/or various input/output interfaces (e.g., mouse, keyboard, touchscreen).

The network interface 916 may provide the computer system 900 with an ability to communicate with a variety of remove devices over a network such as the communication network 107 illustrated in FIG. 1. The network interface 916 may include, for example, an Ethernet adapter, a Fibre Channel adapter, and/or other wired- or wireless-enabled adapter. The network interface 916 may provide a direct or indirect connection from one network element to another, and facilitate communication and between various network elements.

The storage adapter 920 may connect to a standard computer readable medium for storage and/or retrieval of information, such as a fixed disk drive (internal or external).

Other devices, components, elements, or subsystems (not illustrated) may be connected in a similar manner to the interconnect 910 or via a network such as the communication network 107. The devices and subsystems can be interconnected in different ways from that shown in FIG. 9. Instructions to implement various examples and implementations described herein may be stored in computer-readable storage media such as one or more of system memory 918 or other storage. Instructions to implement the present disclosure may also be received via one or more interfaces and stored in memory. The operating system provided on computing system 900 may be MS-DOS®, MS-WINDOWS®, OS/2®, OS X®, IOS®, ANDROID®, UNIX®, Linux®, or another operating system.

Figure 10:
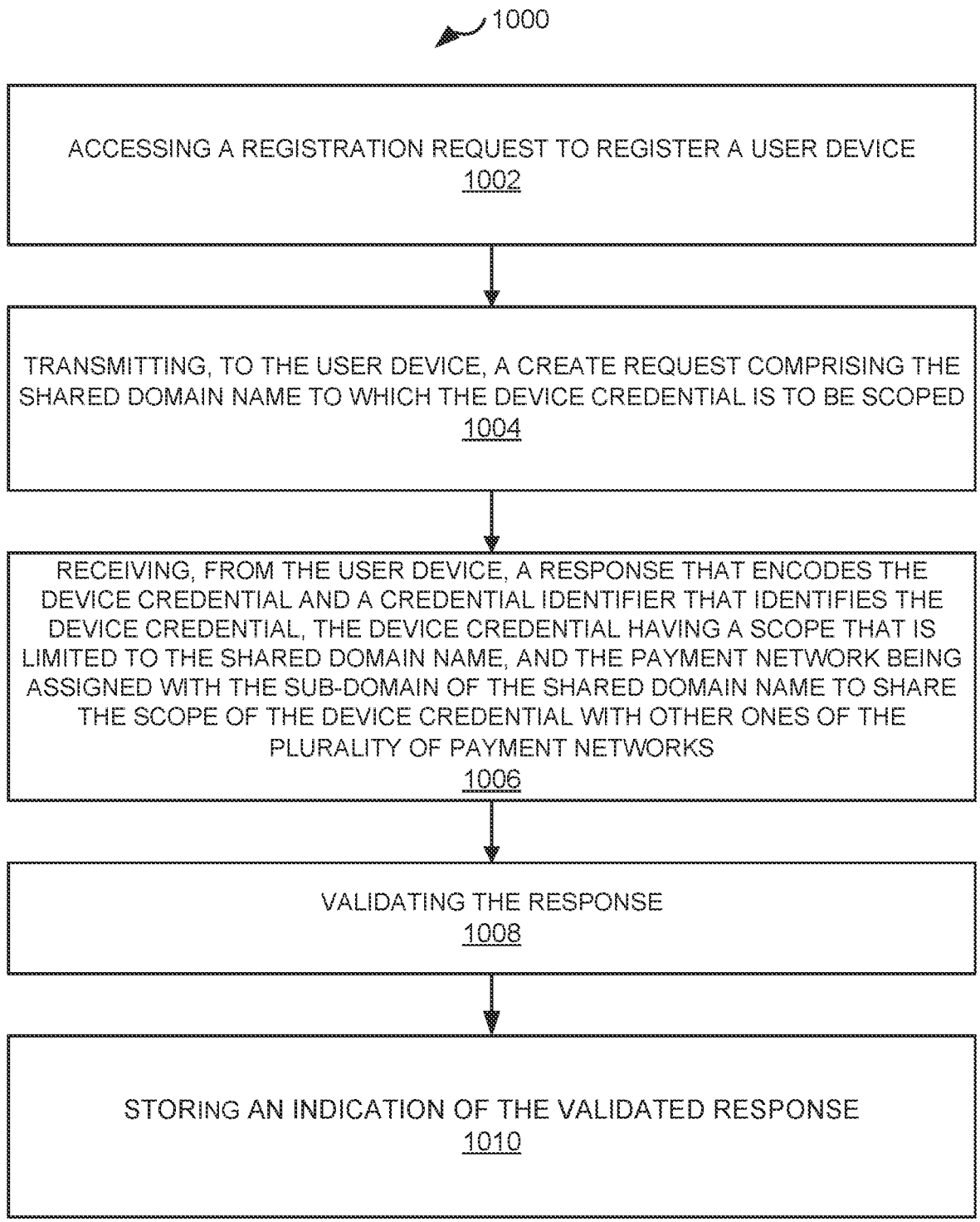
FIG. 10 illustrates an example of a method of creating a device credential scoped to the common domain and federating the device credential.

FIG. 10 illustrates an example of a method 1000 of creating a device credential scoped to the common domain 101 and federating the device credential.

At 1002, the method 1000 may include accessing a registration request to register a user device, the registration request being redirected from a sub-domain (such as sub-domain 111A) assigned to the payment network (such as payment network 130A) to a domain name (such as the domain name 131A) associated with the payment network.

At 1004, the method 1000 may include transmitting, to the user device, a create request comprising the common domain to which the device credential is to be scoped. The common domain may be different than the domain name associated with the payment network and the sub-domain assigned to the payment network may be a sub-domain of the common domain. As described herein, the foregoing may permit different payment networks to federate and authenticate a scoped device credential. In some examples, transmitting the create request may include transmitting an API call, such as an API create call, to an authenticator API (such as the authenticator API 114) of the user device, and controlling, based on the API call, an authenticator (such as the authenticator 116) of the user device to create the key pair.

At 1006, the method 1000 may include receiving, from the user device, a response that encodes the device credential and a credential identifier that identifies the device credential, the device credential having a scope that is limited to the common domain, and the payment network being assigned with the sub-domain of the common domain to share the scope of the device credential with other ones of the plurality of payment networks.

At 1008, the method 1000 may include validating the response. In some examples, the device credential may be created as part of a key pair that includes a private key. In these examples, validating the response may include receiving, from the user device, digitally signed data signed with the private key of the authenticator and determining, based on a public key of the authenticator and the challenge, that the digitally signed data was digitally signed by the authenticator. In this way, the relying party may trust that the authenticator provided the response.

At 1010, the method 1000 may include storing an indication of the validated response. In some examples, the method 1000 may include federating the device credential to other ones of the payment networks responsive to the validation of the response. Once federated, a payment transaction may be processed through the payment network or other payment network of a payment option selected by the user.

Figure 11:
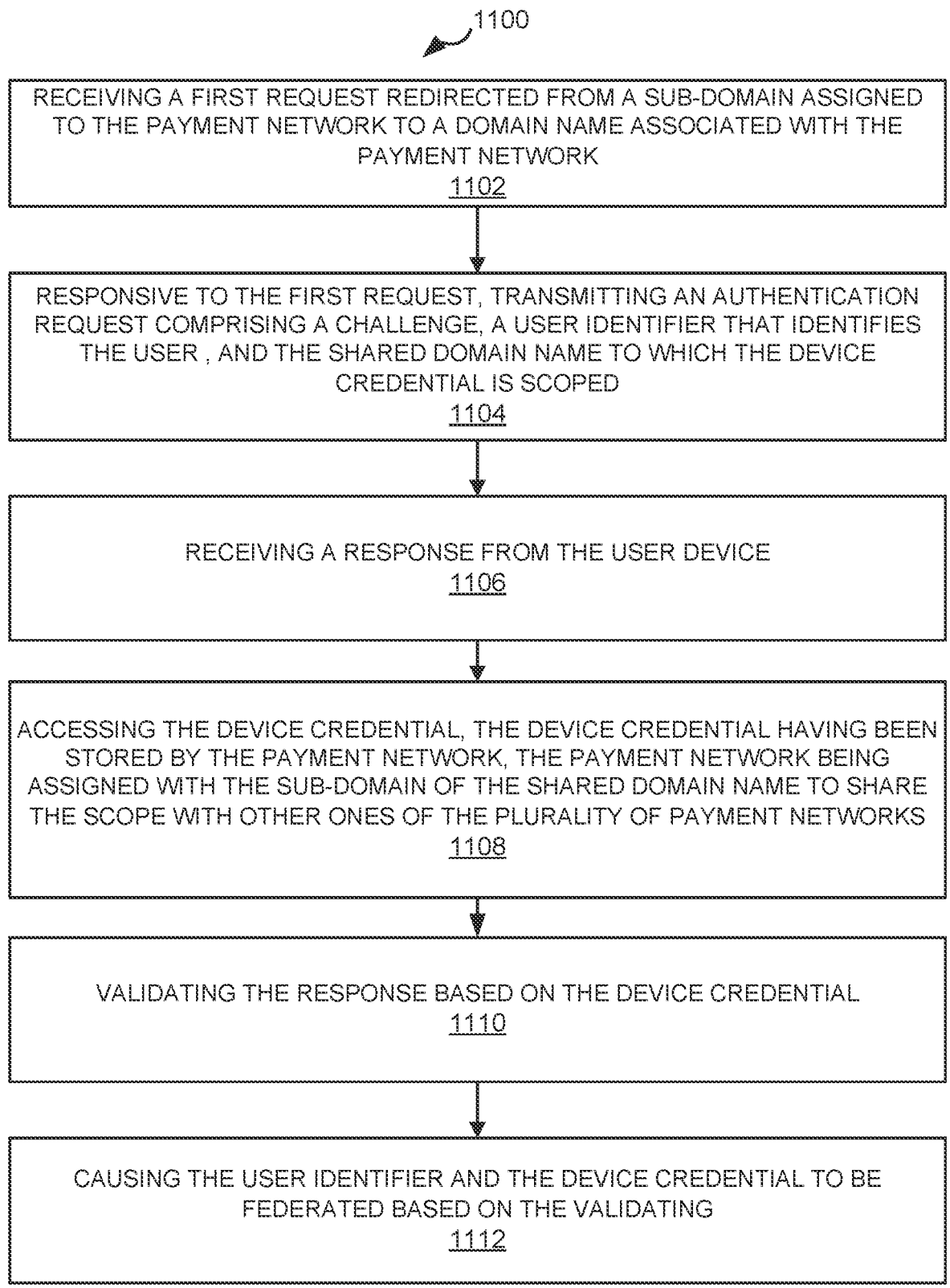
FIG. 11 illustrates an example of a method of authenticating a user device based on the federated device credential scoped to the common domain.

FIG. 11 illustrates an example of a method 1100 of authenticating the user device 110 based on the federated device credential scoped to the common domain 101. The method 1100 may be performed in connection with a purchase transaction between the user device 110 and a merchant, such as a merchant 120A.

At 1102, the method 1100 may include receiving a first request redirected from a sub-domain, such as the sub-domain 111A, assigned to the payment network (such as the payment network 130A) to a domain name (such as the domain name 131A) associated with the payment network. In some examples, the first request may be received via an authentication interface (such as authentication interface 136A) of the payment network. The sub-domain may resolve to the authentication interface based on the redirection from the sub-domain to the domain name.

In some examples, the first request may be received from an SRCI (such as the SRCI 122) that initiates payment transactions on behalf of the merchant 120A. In these examples, the payment network may implement the SRC specification, which may facilitate SRC payments through the plurality of payment networks 130. Also, in these examples, accessing the request to authenticate the user device may include receiving the first request to authenticate the user device from an SRC initiator that initiates the payment transaction as an SRC payment and transmits the request to the sub-domain assigned to the payment network.

At 1104, the method 1100 may include responsive to the first request, transmitting an authentication request comprising a challenge, a user identifier that identifies the user, and the common domain to which the device credential is scoped. In some examples, the authentication request may be transmitted as an API call (such as an API get call) to an authenticator API (such as the authenticator API 114). Through the API call, the method 1100 may control an authenticator (such as the authenticator 116) of the user device 110 to digitally sign data comprising the challenge using credential's private key. In some examples, the authentication request may be transmitted via a communication session that identifies the common domain as an origin of the authentication request so that the user device 110 may determine the origin.

At 1106, the method 1100 may include receiving, from the user device, a response.

At 1108, the method 1100 may include accessing the device credential, the device credential having been stored by the payment network, the payment network being assigned with the sub-domain of the common domain to share the scope with other ones of the plurality of payment networks.

At 1110, the method 1100 may include validating the response based on the device credential. In some examples, the response may include the digitally signed data signed based on the challenge and a private key (such as the private key 105) created with the device credential as a key pair. In these examples, validating the response may include decrypting the digitally signed data based on the device credential and verifying that the user device has possession of the private key based on the decrypting.

In some examples, the response may encode the origin of the authentication request. In these examples, validating the response may include determining that the origin encoded in the response matches the common domain even though the common domain is different from the domain name associated with the payment network. A relying party, such as a payment network, may determine that a mismatch between the origin and the domain of the relying party may indicate a phishing attack. However, as described herein, because the payment network shares the common domain with other payment networks to share the scope of the device credential, the payment network may expect the origin to be equal to the common domain.

At 1112, the method 1100 may include causing the user identifier the device credential to be federated to other ones of the plurality of networks based on the validating. For example, the method 1100 may conclude that the user identified by the user identifier has been authenticated and user device has been previously registered based on the validated device authentication. In some examples, after validating the response, the user identifier and the device credential may be federated to other SRC systems prior to initiating a payment transaction. In some examples, the user identifier and the device credential may be federated to other SRC systems through a token, such as the JWT token described herein. In some examples, after authenticating the user device and, in some examples, after federating the device credential to other SRC systems, a payment transaction may be initiated and processed through the payment network or other payment network of a payment option selected by the user.

The mapping table 142 and/or the user profile database 139A described herein may be, include, or interface to, for example, an Oracle™ relational database sold commercially by Oracle Corporation. Other databases, such as Informix™, DB2 or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may include cloud-based storage solutions. The database may store a plurality of types of data and/or files and associated data or file descriptions, administrative information, or any other data. The various databases may store predefined and/or customized data described herein.

Throughout the disclosure, the terms "a" and "an" may be intended to denote at least one of a particular element. As used herein, the term "includes" means includes but not limited to, the term "including" means including but not limited to. The term "based on" means based at least in part on. In the Figures, the use of the letter "N" to denote plurality in reference symbols is not intended to refer to a particular number. For example, "120A, B, N" does not refer to 3 instances of 120, but rather "two or more."

The systems and processes are not limited to the specific embodiments described herein. In addition, components of each system and each process can be practiced independent and separate from other components and processes described herein. Each component and process also can be used in combination with other assembly packages and processes. The flow charts and descriptions thereof herein should not be understood to prescribe a fixed order of performing the method blocks described therein. Rather the method blocks may be performed in any order that is practicable including simultaneous performance of at least some method blocks. Furthermore, each of the methods may be performed by one or more of the system components illustrated in FIG. 1.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As will be appreciated based on the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. Example computer-readable media may be, but are not limited to, a flash memory drive, digital versatile disc (DVD), compact disc (CD), fixed (hard) drive, diskette, optical disk, magnetic tape, semiconductor memory such as read-only memory (ROM), and/or any transmitting/receiving medium such as the Internet or other communication network or link. By way of example and not limitation, computer-readable media comprise computer-readable storage media and communication media. Computer-readable storage media are tangible and non-transitory and store information such as computer-readable instructions, data structures, program modules, and other data. Communication media, in contrast, typically embody computer-readable instructions, data structures, program modules, or other data in a transitory modulated signal such as a carrier wave or other transport mechanism and include any information delivery media. Combinations of any of the above are also included in the scope of computer-readable media. The article of manufacture containing the computer code may be made and/or used by executing the code directly from one medium, by copying the code from one medium to another medium, or by transmitting the code over a network.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system of registering a user device to be authenticated by a device credential scoped to a common domain shared among a plurality of payment networks, each payment network having a respective domain name different than the common domain and each payment network being assigned with a respective sub-domain of the common domain, the system comprising:
    a server of a payment network of the plurality of payment networks, the server to:
        access a registration request to register a user device, the registration request being redirected from a sub-domain assigned to the payment network to a domain name associated with the payment network;
        transmit, to the user device, a create request comprising the common domain to which the device credential is to be scoped, the common domain being different than the domain name associated with the payment network, and a sub-domain assigned to the payment network being a sub-domain of the common domain;
        receive, from the user device, a response that encodes the device credential and a credential identifier that identifies the device credential, the device credential having a scope that is limited to the common domain, and the payment network being assigned with the sub-domain of the common domain to share the scope of the device credential with other ones of the plurality of payment networks;
        validate the response; and
        store an indication of the validated response.

2. The system of claim 1, wherein the create request includes a challenge and wherein the device credential was created as part of a key pair that includes a private key, and wherein to validate the response, the server is further to:
    receive, from the user device, digitally signed data signed with a private key of an authenticator of the user device that generated the key pair; and
    determine, based on a public key associated with the authenticator device and the challenge, that the digitally signed data was digitally signed by the authenticator.

3. The system of claim 2, wherein to transmit the create request, the server is further to:
    transmit an application programming interface (API) call to an authenticator API of the user device; and
    control, based on the API call, an authenticator of the user device to create the key pair.

4. The system of claim 1, wherein the registration request is associated with a purchase transaction, and wherein the server is further to:

access a checkout payload associated with a payment transaction;

transmit the checkout payload to a purchase interface associated with a merchant to complete the payment transaction; and process the payment transaction through the payment network.

5. The system of claim 1, wherein the server is further to: federate the device credential and a user identifier associated with the device credential to other ones of the payment networks responsive to the validation of the response.

6. The system of claim 1, further comprising:
a second server of a relying party other than the payment network, the second server to register a second user device based on a second sub-domain of the common domain to generate a second device credential scoped to the common domain, the second sub-domain being assigned to the relying party other than the payment network to participate in registering or authenticating the second device credential scoped to the common domain.

7. The system of claim 6, wherein the relying party is a merchant.

8. The system of claim 6, wherein the relying party is a party other than a merchant or the payment network.

9. The system of claim 6, wherein the server is further to: federate the device credential and a user identifier associated with the device credential to the second server responsive to the validation of the response, wherein the second server of the relying party other than the payment network is to authenticate the device credential to authenticate the user device registered by the server of the payment network.

10. A method of registering a user device to be authenticated by a device credential scoped to a common domain shared among a plurality of payment networks, each payment network having a respective domain name different than the common domain and each payment network being assigned with a respective sub-domain of the common domain, the method comprising:

accessing, by a server of a payment network of the plurality of payment networks, a registration request to register a user device, the registration request being redirected from a sub-domain assigned to the payment network to a domain name associated with the payment network;

transmitting, by the server of the payment network, to the user device, a create request comprising the common domain to which the device credential is to be scoped, the common domain being different than the domain name associated with the payment network, and the sub-domain assigned to the payment network being a sub-domain of the common domain;

receiving, by the server of the payment network, from the user device, a response that encodes the device credential and a credential identifier that identifies the device credential, the device credential having a scope that is limited to the common domain, and the payment network being assigned with the sub-domain of the common domain to share the scope of the device credential with other ones of the plurality of payment networks;

validating, by the server of the payment network, the response; and storing, by the server of the payment network, an indication of the validated response.

11. The method of claim 10, wherein the create request includes a challenge and wherein the device credential was created as part of a key pair that includes a private key, and wherein validating the response comprises:

receiving, by the server, from the user device, digitally signed data signed with a private key of an authenticator of the user device that generated the key pair; and determining, by the server, based on a public key associated with the authenticator device and the challenge, that the digitally signed data was digitally signed by the authenticator.

12. The method of claim 11, wherein transmitting the create request comprises:

transmitting an application programming interface (API) call to an authenticator API of the user device; and controlling, based on the API call, an authenticator of the user device to create the key pair.

13. The method of claim 10, wherein the registration request is associated with a purchase transaction, the method further comprising:

accessing, by the server, a checkout payload associated with a payment transaction;

transmitting, by the server, the checkout payload to a purchase interface associated with a merchant to complete the payment transaction; and processing, by the server, the payment transaction through the payment network.

14. The method of claim 10, further comprising:
federating, by the server, the device credential and a user identifier associated with the device credential to other ones of the payment networks responsive to the validation of the response.

15. The method of claim 10, further comprising:
registering, by a second server of a relying party other than the payment network, a second user device based on a second sub-domain of the common domain to generate a second device credential scoped to the common domain, the second sub-domain being assigned to the relying party other than the payment network to participate in registering or authenticating the second device credential scoped to the common domain.

16. The method of claim 15, wherein the relying party is a merchant.

17. The method of claim 15, wherein the relying party is a party other than a merchant or the payment network.

18. The method of claim 15, further comprising:
federating, by the server, the device credential and a user identifier associated with the device credential to the second server responsive to the validation of the response;

authenticating, by the second server of the relying party other than the payment network, the device credential to authenticate the user device registered by the server of the payment network.

19. A non-transitory computer readable medium storing instructions for registering a user device to be authenticated by a device credential scoped to a common domain shared among a plurality of payment networks, each payment network having a respective domain name different than the common domain and each payment network being assigned with a respective sub-domain of the common domain, the instructions, when executed by a server of a payment network, cause the server to:

access a registration request to register a user device, the registration request being redirected from a sub-domain assigned to the payment network to a domain name associated with the payment network;

transmit, to the user device, a create request comprising the common domain to which the device credential is to be scoped, the common domain being different than the domain name associated with the payment network, and the sub-domain assigned to the payment network being a sub-domain of the common domain;

receive, from the user device, a response that encodes the device credential and a credential identifier that identifies the device credential, the device credential having a scope that is limited to the common domain, and the payment network being assigned with the sub-domain of the common domain to share the scope of the device credential with other ones of the plurality of payment networks;

validate the response; and store an indication of the validated response.

20. The non-transitory computer readable medium of claim 19, wherein the instructions, when executed by the server, further cause the server to:

federate the device credential and a user identifier associated with the device credential to other ones of the payment networks responsive to the validation of the response.

\* \* \* \* \*